US010735215B2

(12) United States Patent
Kang et al.

(10) Patent No.: US 10,735,215 B2
(45) Date of Patent: Aug. 4, 2020

(54) METHOD AND APPARATUS FOR PROVIDING USER ADAPTIVE SERVICE

(71) Applicant: Samsung Electronics Co., Ltd., Suwon-si, Gyeonggi-do (KR)

(72) Inventors: Hyeonjin Kang, Seoul (KR); Sangjun Moon, Yongin-si (KR); Jongho Bang, Seongnam-si (KR); Dohy Hong, Fontenay sous Bois (FR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 15/525,466

(22) PCT Filed: Nov. 16, 2015

(86) PCT No.: PCT/KR2015/012269
§ 371 (c)(1),
(2) Date: May 9, 2017

(87) PCT Pub. No.: WO2016/076674
PCT Pub. Date: May 19, 2016

(65) Prior Publication Data
US 2017/0324578 A1 Nov. 9, 2017

(30) Foreign Application Priority Data

Nov. 14, 2014 (KR) .................. 10-2014-0159116
Mar. 12, 2015 (KR) .................. 10-2015-0034554
May 12, 2015 (KR) .................. 10-2015-0066245

(51) Int. Cl.
*H04L 12/28* (2006.01)
*H04L 29/08* (2006.01)
(Continued)

(52) U.S. Cl.
CPC .......... *H04L 12/2814* (2013.01); *H04L 12/16* (2013.01); *H04L 12/2809* (2013.01);
(Continued)

(58) Field of Classification Search
None
See application file for complete search history.

(56) References Cited

U.S. PATENT DOCUMENTS 6,188,899 B1 * 2/2001 Chatterjee ............. H04W 8/265
455/435.1
8,660,529 B2 * 2/2014 Park ......................... G06F 21/73
455/410
(Continued)

FOREIGN PATENT DOCUMENTS

| CN | 101227457 A | 7/2008 |
| CN | 101282350 A | 10/2008 |

(Continued)

OTHER PUBLICATIONS

Chinese Office Action dated Nov. 11, 2019, issued in Chinese Application No. 201580061872.1.

*Primary Examiner* — Thomas J Dailey
(74) *Attorney, Agent, or Firm* — Jefferson IP Law, LLP

(57) ABSTRACT

A method for determining an operation to be performed for an object identified by a device, and an apparatus therefor are disclosed. In one embodiment, the method includes generating representative identification information of the terminal, transmitting, to a server, user information including the representative identification information of the terminal, and advertising the representative identification information of the terminal. According to another embodiment, a service receiver and a service provider can use all available services even while minimizing requirements that must be fulfilled. The present disclosure may be directed to a technology for a sensor network, machine to machine commu- (Continued)

nication, machine type communication and Internet of things. The present disclosure may be applied to intelligent services (related to a smart home, a smart building, a smart city, a smart car or a connected car, healthcare, digital education, retail business, security, safety, and the like) on the basis of the technology.

15 Claims, 15 Drawing Sheets

(51) Int. Cl.
H04L 12/58 (2006.01)
H04L 29/06 (2006.01)
H04L 12/16 (2006.01)

(52) U.S. Cl.
CPC .......... *H04L 12/2829* (2013.01); *H04L 29/06* (2013.01); *H04L 29/08* (2013.01); *H04L 51/18* (2013.01); *H04L 67/16* (2013.01); *H04L 67/26* (2013.01); *H04L 67/30* (2013.01); *H04L 67/303* (2013.01); *H04L 67/306* (2013.01); *H04L 67/12* (2013.01); *H04L 67/18* (2013.01); *H04L 67/22* (2013.01)

(56) References Cited

U.S. PATENT DOCUMENTS

| | | | |
|---|---|---|---|
| 2002/0132614 A1 | 9/2002 | Vanluijt et al. | |
| 2004/0203636 A1 | 10/2004 | Chan et al. | |
| 2006/0230130 A1* | 10/2006 | Cho | H04L 12/2818 709/223 |
| 2009/0093232 A1 | 4/2009 | Gupta et al. | |
| 2009/0271268 A1 | 10/2009 | Zhao et al. | |
| 2009/0274094 A1 | 11/2009 | Engwer | |
| 2010/0061294 A1* | 3/2010 | Proctor, Jr. | H04W 4/029 370/328 |
| 2010/0232409 A1 | 9/2010 | Kim et al. | |
| 2013/0097274 A1* | 4/2013 | Moss | H04L 12/403 709/208 |
| 2013/0174196 A1* | 7/2013 | Herlein | G06Q 30/02 725/35 |
| 2013/0203413 A1 | 8/2013 | Lambert | |
| 2013/0282438 A1 | 10/2013 | Hunter et al. | |
| 2014/0282620 A1* | 9/2014 | Nuovo | G06F 17/30867 719/318 |
| 2015/0079942 A1* | 3/2015 | Kostka | H04W 4/21 455/411 |

FOREIGN PATENT DOCUMENTS

| | | |
|---|---|---|
| CN | 101827114 A | 9/2010 |
| CN | 103326990 A | 9/2013 |
| KR | 10-2011-0014619 A | 2/2011 |
| KR | 10-2012-0004534 A | 1/2012 |
| KR | 10-1363586 B1 | 2/2014 |
| KR | 10-2014-0124835 A | 10/2014 |

* cited by examiner

METHOD AND APPARATUS FOR PROVIDING USER ADAPTIVE SERVICE

TECHNICAL FIELD

The present invention relates to a method and a procedure for an apparatus to determine a task that needs to be performed for its recognized target.

BACKGROUND ART

The Internet has evolved from a human-based connection network, where humans create and consume information, to the Internet of Things (IoT) where distributed configurations, such as things, etc., exchange information with each other to process the information. The technology related to the IoT is starting to be combined with, for example, a technology for processing big data through connection with a cloud server, etc., and this is called an Internet of Everything (IoE) technology. In order to manifest the IoT, various technical components are required, such as, a sensing technology, wired/wireless communication and network infra technology, a service interfacing technology, a security technology, etc. In recent years, a sensor network for connecting things, Machine to Machine (M2M) communication, Machine Type Communication (MTC), etc. have been researched.

Under the IoT environment, intelligent Internet Technology (IT) services may be provided to collect and analyze data obtained from objects connected to each other and thus to create new value for human life. As existing information technologies are fused and combined with various industries, the IoT may also be applied within various fields, such as: smart homes, smart buildings, smart cities, smart cars or connected cars, smart grids, health care, smart home appliances, high quality medical services, etc.

Transmission is performed for the purpose of reception by as many objects as possible without designating a specific target is called 'to advertise.' In wireless communication, information whose amount is in generally not much and that is frequently advertised is called a beacon.

An apparatus for advertising a beacon is called a beacon apparatus. A beacon service is referred to as a task that is directly or indirectly indicated by an advertised beam and is performed by an apparatus that receiving the advertised beacon.

FIG. 1 is a diagram showing an example of a beacon service.

A beacon service may be a service that: if an application (App) is installed that enables a user apparatus, such as a user terminal, user equipment (UE), etc. to recognize a beacon advertised by, e.g., a beacon apparatus, and to perform a specific task corresponding to the beacon, the service enables UE to perform the specific task; or a service that: if UE receives a beacon that the UE can recognize in its received first beacon state, the service enables the UE to performs a specific task according to the beacon.

The beacon apparatus is capable of including a service identifier in a beacon and advertising the beacon. For example, the service identifier may include parameters, such as, Unique User ID (UUID), Major, Minor, etc. UUID may be a unique identifier of a service that a beacon apparatus needs to provide. Major and Minor may be detailed identifiers of a corresponding service. That is, this scheme is a method that enables a beacon apparatus to provide UE with identification information. In this case, the identification information may be a service identifier. UE transmits identification information to a server containing information regarding a beacon, and receives information related to the identification information, so that the user can use the information as the need arises.

For example, when a user apparatus approaches a corner of specific goods in a shopping mall, if there is a beacon service to provide an online coupon to the user apparatus, UUID, Major, and Minor identifier included in a beacon advertised by a beacon apparatus may be 'a service for providing a shopping mall on-line couple', 'Gangnam branch', and '$1^{st}$ floor' respectively.

However, in the case of the beacon service described above, one or more UUIDs, which can be recognized in a state where user apparatus capable of a beacon service, such as UE, is first obtained, may be just default items provided by user apparatus manufacturers. That is, if a user needs to use, via a user apparatus, services provided by beacon apparatuses having different UUIDs provided by various 3rd-parties, Apps corresponding to UUIDs of beacon apparatuses must be installed respectively. Otherwise, the user apparatus cannot use a corresponding beacon service.

That is, an available beacon service is restricted to a beacon of UUID that can be recognized by a user apparatus. Although 100 beacon apparatuses having UUIDs that differ from each other near a user apparatus advertise beacons respectively, if the user apparatus is capable of recognizing only three UUIDs by default or via an App installed thereto, the user can use only three of the 100 beacon services via the corresponding user apparatus.

With reference to FIG. 1, the user apparatus 110 is capable of receiving beacons 113 and 115 from two beacon apparatuses, respectively. A first beacon 113 may have identifiers, such as UUID 1, Major 1, and Minor 1. A second beacon 115 may have identifiers, such as UUID 2, Major 2, and Minor 2. In this case, the user apparatus 110 may has an App capable of recognizing UUID1 of the first beacon 113, but may not have an App capable of recognizing UUID2 of the second beacon 115.

The user apparatus 110 may transmit, to the server 120, its recognized identification information (e.g., UUID 1, Major 1, and Minor 1) of the first beacon 113, and its identifier (e.g., UE ID, etc.). The server 120 may instruct a smart electric bulb server 130 corresponding to UUID1 to operate an electric bulb 135 corresponding to Major 1 and Minor 1. However, since the second beacon 115 cannot be recognized by the user apparatus 110, the server 120 does not instruct the operation of a smart Large Format Display (LFD) 145 corresponding to UUID of the second beacon 115.

As described above, if a user apparatus needs to use services provided by beacon apparatuses, it may have installed Apps corresponding to UUIDs of the beacon apparatuses or may be in a state where it is recognized by the beacon apparatuses. Otherwise, the user apparatus cannot use a corresponding beacon service.

In beacon services, the greater the number of beacon apparatuses that a user apparatus can use is near the user apparatus, the more frequently the user apparatus uses operation resources and connects to the Internet in order to perform a task to meet its received beacon. This lead to proportionally increase the current consumption in the user apparatus.

If UE receives a service identifier transmitted by a beacon apparatus, it may detect its current location via the communication with a server linking a service identifier to a place. UE provides information which can be used at the location, using its location information, or executes a location-related application, thereby providing the user with a service. In this case, the intention of a service provider who installed a beacon may be reflected larger than a user's intention. For example, if a user visits a store, UE receiving a service identifier of a beacon may receive a service introducing recent expensive goods according to the intention of the store owner. However, if the user visited the store with a purpose not to buy goods but to find his/her lost purse/wallet, the intention of the store owner does not fit with the user's intention, and thus the store owner may provide the user with an incorrect service.

FIG. 2 is a diagram showing an example of a short-range user information providing system.

With reference to FIG. 2, in a short-range user information system, a client 210 detects nearby user apparatuses 220 and 225 in a short-range and is returned public information regarding the detected user apparatus 220.

In this case, if the client 210 detecting the short-range user apparatus 220 requests a corresponding user's public information from an information providing server 230, the information providing server 230 may provide, if it has published information regarding the corresponding user apparatus 220, the information to the client 210. In this case, in order to provide a customized service to the detected user apparatus 220, the client 210 receiving the published information needs to include an operation ability to determine a service suitable for the detected user 220 based on public information received from the information providing server 230.

Therefore, in order to provide a customized service, the client 210 needs a storage device, a controller with a relatively high performance of operation ability, such as an operational unit, etc. This causes the client 210 to consume additional energy, and also increases the unit cost of the client 210. It may not be efficient for a short-range user information system to apply an Internet of Thing (IoT) environment that enables various types of things to provide a highly favorable service to a target.

For example, although a Large Format Display (LFD), as one of things, provides customized advertisements based on a user's inclination and tendency, it needs a great effort to be developed to provide customized advertisement to a specific user, as a typical example of a detected user apparatus.

That is, after detecting a user apparatus 220, LFD 210 may request published information regarding the detected user apparatus 220 from the information providing server 230. In this case, although the LFD 210 obtains published information regarding the detected user apparatus 220 that needs to receive customized advertisement, if the published information does not include information indicating an advertisement to be displayed, the LFD 210 needs to: analyze its received published information regarding the corresponding user: and directly select an advertisement which can be likely to attract a user's goodwill among the advertisements the LFD 210 can display. To this end, each LFD 210 needs to further include an operational unit and a memory device, and requires much time and energy for a task to operate the added components and analyze the published information.

DISCLOSURE OF INVENTION

Technical Problem

The present invention has been made to address the above problems and disadvantages, and to provide at least the advantages described below. Accordingly, the present invention provides an objective to minimize a requirement for a service receiver and a service provider and allow the service receiver and the service provider to use as many services as possible.

The present invention further provides an objective that: does not restrict services that can be used by users to the limitation of user apparatus, such as the App installation to user apparatuses, the Internet connection, the needs of operational resources, etc.; enables a service provider to minimize its requirements required to provide services; and allows users to use as many services as possible.

The present invention further provides a method and apparatus for providing a micro-location service to meet a user's real-time situation (e.g., a user's current taste, intention, behavior purpose, location, etc.).

This section, technical problem, is merely intended to provide a few aspects of the present invention. It should be understood that the features and advantages of the present invention are not limited to those in the foregoing description, and the other features and advantages not described above will become more apparent from the following description.

Solution to Problem

In accordance with an aspect of the present invention, a method for a terminal to provide a user-customized service is provided. The method includes: creating main identification information of the terminal; transmitting, to a server, user information containing the main identification information of the terminal; and advertising the main identification information of the terminal.

Preferably, the user information includes information according to a preset condition of the terminal.

Preferably, the user information is created based on a user input signal.

In accordance with another aspect of the present invention, a method for a device to provide a user-customized service is provided. The method includes: transmitting, to a server, device information containing main device identification information; detecting main identification information of the terminal; transmitting, to the server, the detected main identification information of the terminal and the main device identification information; and receiving, from the server, a message containing operation information regarding the device corresponding to the terminal, and performing a function corresponding to the message.

Preferably, the method further includes: collecting information created for a specific terminal; and transmitting the collected information to the server.

In accordance with another aspect of the present invention, a method for a server to provide a user-customized service is provided. The method includes: storing: at least one piece of user information containing main identification information of the terminal; and at least one piece of device information containing main device identification information; receiving, from a device, the main device identification information and main identification information of the terminal detected by the device; determining operation information of the device according to the main identification information of the terminal; and transmitting, to the device, the operation information of the device according to the main identification information of the terminal.

Preferably, the method further includes: receiving, from a terminal, user information containing the main identification information of the terminal; and receiving, from the device, device information containing the main device identification information.

Preferably, the user information includes: information which differs from each other depending on devices.

Preferably, the method further includes: receiving, from the device, information which is created for a specific terminal and which is collected by the device; and altering the user information or the device information, using the received information created for a specific terminal.

In accordance with another aspect of the present invention, a terminal is provided. The terminal includes: a communication unit for transmitting/receiving signals to/from a device and a server; and a controller for: creating main identification information of the terminal; transmitting, to the server, user information containing the main identification information of the terminal; and advertising the main identification information of the terminal.

In accordance with another aspect of the present invention, a device is provided. The device includes: a communication unit for transmitting/receiving signals to/from a terminal and a server; and a controller for: transmitting, to the server, device information containing main device identification information; detecting main identification information of the terminal; transmitting, to the server, the detected main identification information of the terminal and the main device identification information; and receiving, from the server, a message containing operation information regarding the device corresponding to the terminal, and performing a function corresponding to the message.

In accordance with another aspect of the present invention, a server is provided. The server includes: a communication unit for transmitting/receiving signals to/from a terminal and a device; and a controller for: storing: at least one piece of user information containing main identification information of the terminal; and at least one piece of device information containing main device identification information; receiving, from a device, the main device identification information and main identification information of the terminal detected by the device; determining operation information of the device according to the main identification information of the terminal; and transmitting, to the device, the operation information of the device according to the main identification information of the terminal.

Advantageous Effects of Invention

An embodiment of the present disclosure is capable of minimizing requirements for a service receiver and a service provider and allowing the service receiver and the service provider to use as many services as possible.

An embodiment of the present invention: does not restrict services that can be used by users to the limitation of user apparatus, such as the App installation to user apparatuses, the Internet connection, the needs of operational resources, etc.; enables a service provider to minimize its requirements required to provide services; and allows users to use as many services as possible.

An embodiment of the present invention is capable of enabling various things, e.g., an electric bulb, an LFD, which require a large amount of operational resources such as a controller (e.g., CPU, etc.), a memory, etc., and thus consume a large amount of energy, to provide users with customized service without a great deal of effort and a large amount of resources, if the things are connected to a management and instruction unit.

An embodiment of the present invention is capable of providing nearby thing customized services for users, without directly disclosing information regarding a target unit of a management and instruction unit to a detection and execution unit, and without the worry of leakage of personal information.

An embodiment of the present invention is capable of providing a user with a micro-location service, by considering a user's real-time situation (e.g., a user's current taste, intention, behavior purpose, location, etc.), with a high degree of service satisfaction.

Since an embodiment of the present invention performs the transmission of sound independent of an RF signal and thus provides the independence and the precise short-range measurement, it may perform the automatic authentication process as an important factor, in terms of security.

It should be understood that the advantageous effects of the present invention are not limited to those in the foregoing description, and the other effects not described above will become more apparent from the following description.

MODE FOR THE INVENTION

Hereinafter, embodiments of the present disclosure are described in detail referring to the accompanying drawings.

In the embodiments, detailed descriptions of the technical content which is well-known and is not directly related to the embodiments of the present disclosure is omitted to avoid obscuring the subject matter of the invention.

In the following description, detailed descriptions of well-known functions and structures incorporated herein may be omitted to avoid obscuring the subject matter of the invention. Embodiments of the invention are described in detail with reference to the accompanying drawings. The following terms are defined considering functions of the invention, and may be changed by users or operators according to their needs. Therefore, the terms will be defined throughout the content of this description.

Figure 1:
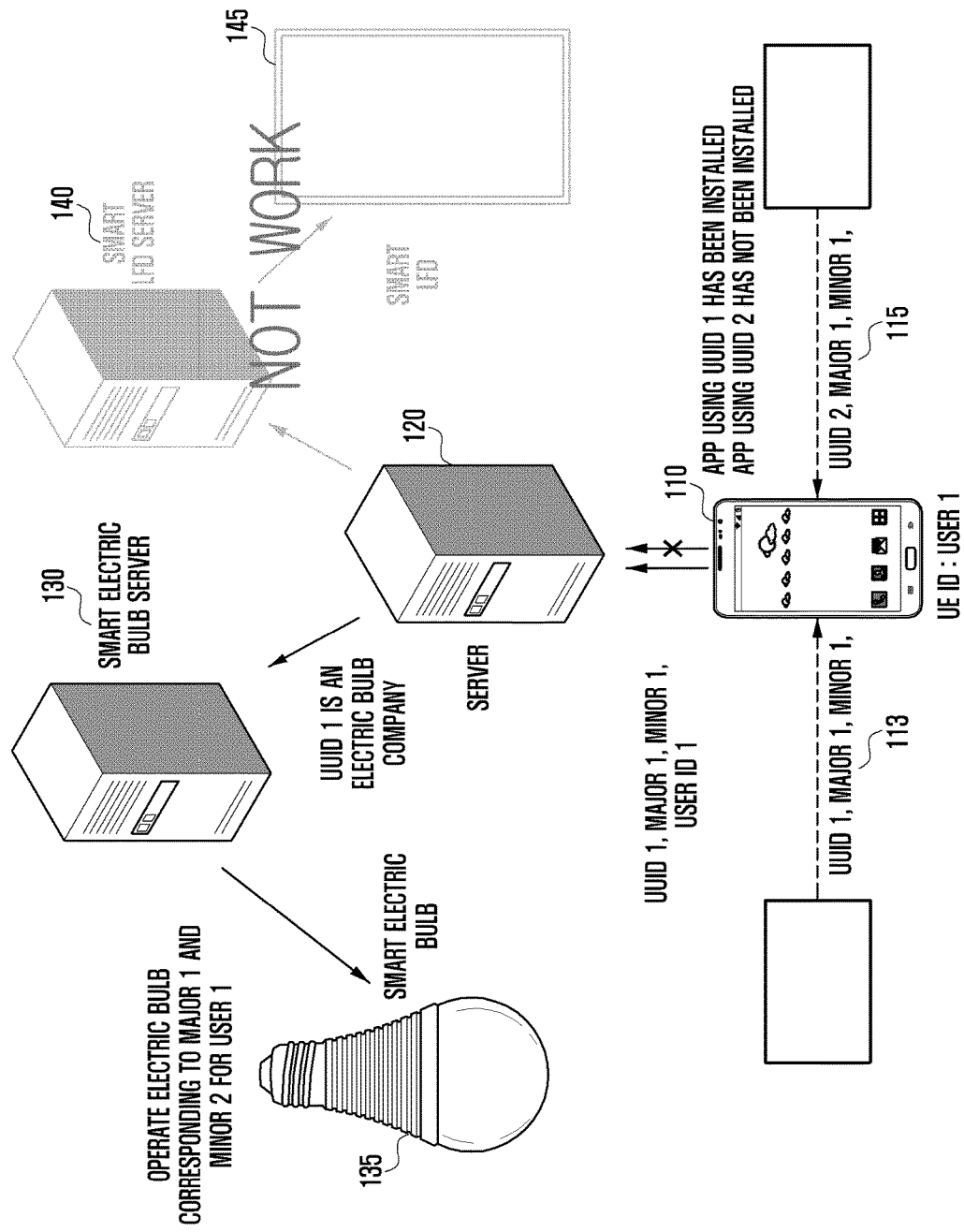
FIG. 1 is a diagram showing an example of a beacon service.
Figure 2:
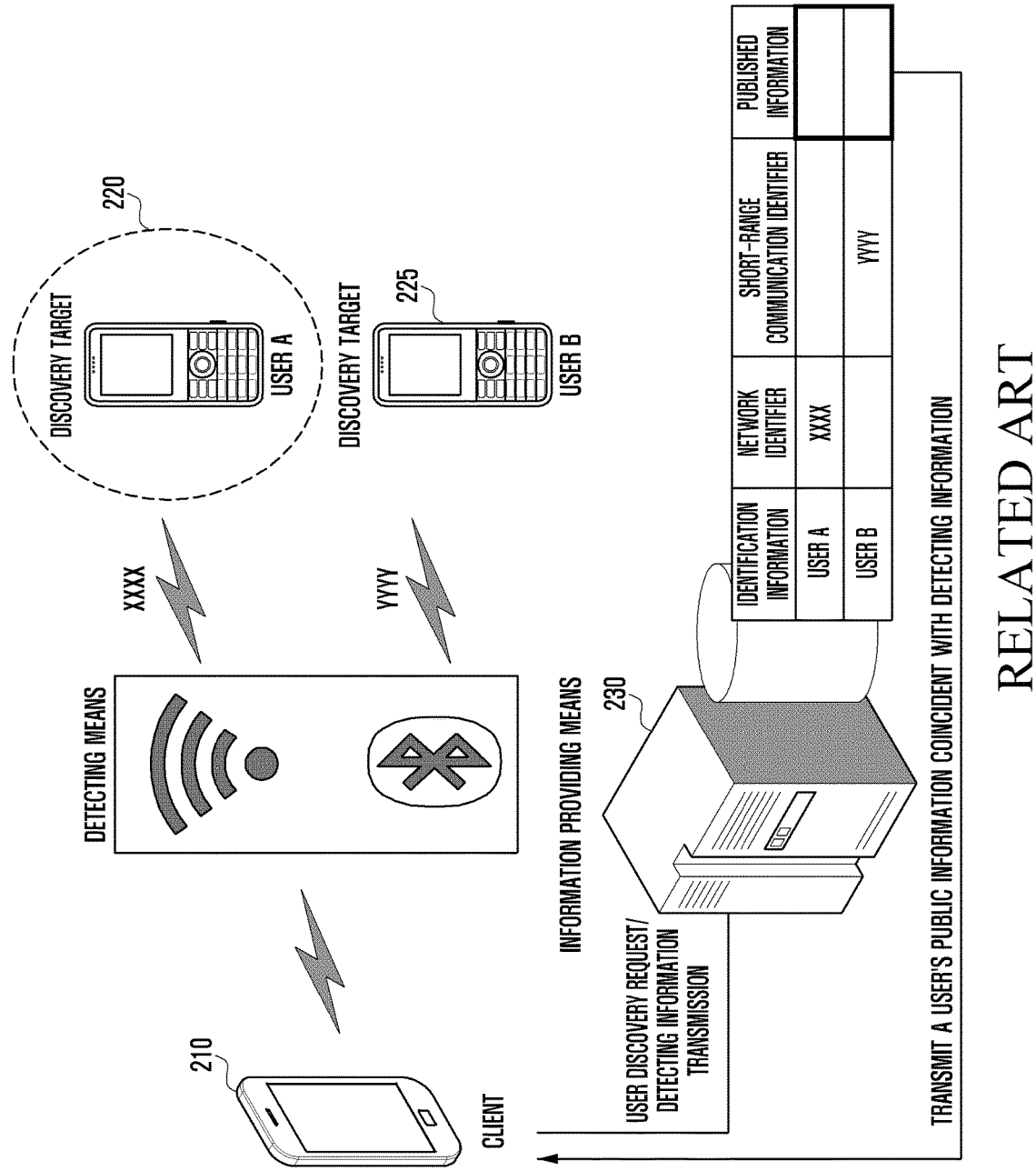
FIG. 2 is a diagram showing an example of a short-range user information providing system.
Figure 3:
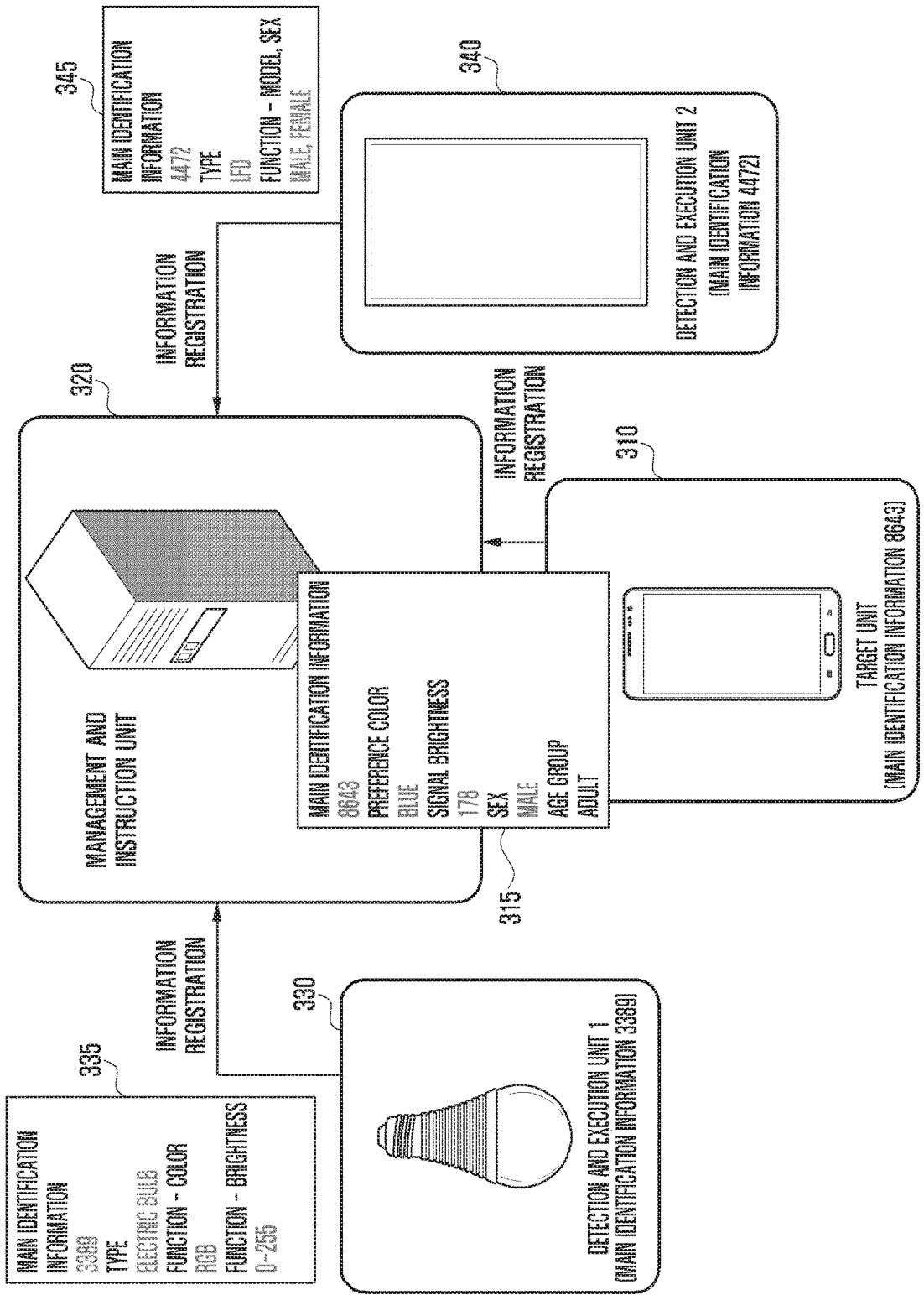
FIG. 3 is a diagram showing an example of the information registration process in a user-customized service providing system according to an embodiment of the present invention.

FIG. 3 is a diagram showing an example of the information registration process in a user-customized service providing system according to an embodiment of the present invention.

With reference to FIG. 3, the user-customized service providing system may include at least one target unit 310, at least one management and instruction unit 320, and at least one or more detection and execution units 330 and 340.

The target unit 310 may be various things, e.g., a smart phone, a wearable device, a resident card, a passport case, a hotel room key, etc. Alternatively, the target unit 310 may also be a user apparatus, such as user equipment (UE) or a terminal.

The detection and execution units 330 are 340 may include various things, e.g., a Large Format Display (LFD), an electric bulb, TV, etc., but are not limited thereto, if they allow users to execute various functions.

The management and instruction unit 320 may be a server and/or a gateway.

With reference to FIG. 3, the target unit 310 and the detection and execution units 330 and 340 may register information in the management and instruction unit 320

First, a description of the information registration by the target unit 310 is provided as follows. The target unit 310 includes one or more pieces of main identification information. The main identification information is referred to as identification information regarding the target unit 310 to be distinguished from another target unit, in order to provide a user-customized service according to an embodiment of the present invention. For example, the main identification information may be input to each user apparatus. That is, a manufacturer of the target unit 310 may input the main identification information to each apparatus, which can serve as the target unit 310, in the manufacturing process. The main identification information may be created by a combination of at least one of the following: numbers, letters and marks. In an embodiment, the main identification information may be created by a specific rule based on various unique identification information obtained when the user first purchases or acquires an apparatus corresponding to the target unit 310. The created, main identification information is unique, main identification information excluded from the other main identification information.

In an embodiment, in order to prevent the main identification information from being misappropriated, the target unit 310 may update the main identification information according to various conditions. In an embodiment, the target unit 310 may encrypt the main identification information, using a specific algorithm, e.g., SHA-1, MD5, etc., each time that a specific condition arises. The encrypted information may be decrypted by a detection and execution unit or a management and instruction unit.

In an embodiment, the target unit 310 may also include various unique identification information having unique values, as well as the main identification information. The unique identification information may be at least one of the following: Uniform resource indicator (URL) indicating, e.g., a specific Internet address; a serial number that a manufacturer assigned to a corresponding target unit 310; the number of manufacture; IMSI and/or TMSI serving as unique information regarding an authentication module (SIM) of a wireless cellular network; ESN and IMEI serving as a unique number of a cellular network; personally unique biometric information regarding an owner (user) of the target unit 310, as electronic information which is normally created or encrypted from retina, fingerprint and vein distribution; and an identifier (ID) of an email or a social network service (SNS).

As described above, the target unit 310 includes the only main identification information or may further include at least one unique identification. Therefore, the target unit 310 may be identified from another target unit or may be estimated as a corresponding target unit 310, according to main identification information and unique identification information exclusively owned by a specific thing or a corresponding thing.

In this case, the target unit 310 may register, in the management and instruction unit 320, various information to receive user-customized information, along with its main identification information. In the present disclosure, for the sake of convenient description, the main identification information and various information, which the target unit 310 registers in the management and instruction unit 320, is called target unit information 315. For the sake of convenience, the target unit information 315 may also be called UE information, user apparatus information, UE information, user information, etc. The target unit information 315 may be stored in the memory of the target unit 315.

The target unit 310 may register the target unit information 315 in the management and instruction unit 320 via various methods and paths. For example, if the target unit 310 is UE (terminal) such as a smart phone, a tablet PC, etc., it may register the target unit information 315 in the management and instruction unit 320, according to information regarding a preference level for providing user-customized information, specifically input by the user. Alternatively, the target unit 310: collects a main category of Apps installed to a corresponding user apparatus, common tendency of frequently visited websites, etc.; extracts a user's information, such as a user's preference, based on the collected information; and registers the extracted information, along with the main identification information, as target unit information 315, in the management and instruction unit 320. In this case, the target unit 310 may perform or stop the collection of the information according to a user's input.

In an embodiment, the registration and/or update of the target unit information 315 in the management and instruction unit 320 may be performed: according to a user's input; periodically; at a specific timing point; or when a specific event occurs. It should be understood that the target unit information 315, stored in the memory of the target unit 310, may be altered or deleted according to a user's input.

As shown in FIG. 3, the target unit information 315 is: '8643' as the main identification information of the target unit 310; 'blue' as a preference color; '178' as preference brightness; 'male' as sex; and 'adult' as age group; and is registered in the management and instruction unit 320. It should be understood that the target unit information 315 is not limited to the listed items, and may include information which can be obtained from information collected according to a user's input or a user's using patterns. For example, a user inputs content that he/she prefers clothes of a specific brand, as the target unit information 315. Alternatively, the target unit 310 may estimate information regarding a user's preference restaurant, etc., based on a user's payment information, as target unit information 315.

Second, a description of the information registration by the detection and execution units 330 and 340 is provided as follows. The detection and execution units 330 and 340 may include one or more main identification information. In an embodiment, the detection and execution units 330 and 340 may also include various unique identification information having unique values, as well as the main identification information. This is similar to the main identification information and the unique identification information described above in the section describing the information registration by the target unit 310. Therefore, a detailed description is omitted as follows. If the main identification information regarding the detection and execution units 330 and 340 does not exist, the management and instruction unit 320 may assign main identification information to individual detection and execution units 330 and 340 to exclusively distinguish from other detection and execution units 330 and 340 until corresponding detection and execution units 330 and 340 are valid. For example, the main identification information may be created by a combination of at least one of the following: numbers, letters and marks, and assigned to the detection and execution units 330 and 340; however, the present invention is not limited thereto.

The detection and execution units 330 and 340 may be identified from another detection and execution unit or may be estimated as corresponding detection and execution units 330 and 340, according to main identification information and unique identification information exclusively owned by a specific thing or a corresponding thing.

In this case, the detection and execution units 330 and 340 may register various information to provide user-customized information, along with their main identification information. In the present disclosure, for the sake of convenient description, the main identification information and various information, which the detection and execution units 330 and 340 register in the management and instruction unit 320, is called detection and execution unit information 335 and 345. For the sake of convenience, the detection and execution unit information 335 and 345 may also be called thing information, device information, etc. The detection and execution unit information 335 and 345 may be stored in the memory of the detection and execution units 330 and 340.

The detection and execution unit information 335 and 345 may include a category of a thing that the detection and execution units 330 and 340 belong to and information regarding functions which can be performed by the detection and execution units 330 and 340. As shown in FIG. 3, the detection and execution units 330 and 340 may be an electric bulb and an LFD.

If the detection and execution unit is an electric bulb 330, the detection and execution unit information 335 may include: '3389' as the main identification information regarding the electric bulb 330; 'electric bulb' as a type; 'RBG' as a function (e.g., color), and '0-225' as a function (e.g., brightness). If the detection and execution unit is an LFD 340, the detection and execution unit information 345 may include: '4472' as the main identification information regarding the LFD 340; 'LFD' as a type; and 'male, female' as a function (e.g., sex of model).

That is, the electric bulb 330 may register, in the management and instruction unit 320, the detection and execution unit information 335 that includes: 'electric bulb' as a category of a thing that the electric bulb 330 belong to; and information indicating the change of a color (e.g., in a range of RBG) and the change of brightness (e.g., levels of 0-225) as functions that the electric bulb 330 can perform, along with its main identification information. The LFD 340 may register, in the management and instruction unit 320, the detection and execution unit information 345 that includes: 'LFD' as a category of a thing that the LFD 340 belonged to; and information regarding the selection of a man or a woman as an advertisement model displayed on the LFD as a function that the LFD 340 can perform, along with its main identification information.

In an embodiment, the detection and execution unit information 335 and 345 may be registered in the management and instruction unit 320 with various methods and paths similar to those for the target unit information 315. For example, the manufacturer of the detection and execution units 330 and 340 stores unique detection and execution unit information 335 and 345 regarding the detection and execution units 330 and 340 in the detection and execution units 330 and 340 respectively in the manufacture process, and then registers the stored information in the management and instruction unit 320 via a registration procedure. Alternatively, a purchaser (i.e., user) of the detection and execution units 330 and 340 may create the detection and execution unit information 335 and 345 in such a way that the purchaser inputs functions which can be performed after the purchase. For example, if the detection and execution unit is an LFD 340, although the manufacturer has stored information to distinguish between only sex of a displayed model as the detection and execution unit information 345, the detection and execution unit information 345 may further include a function for enabling a user to change the display screen in terms of black and white or color, according to a user's inputs.

In an embodiment, the registration and/or update of the detection and execution unit information 335 and 345 in the management and instruction unit 320 may be performed: according to a user's input; periodically; at a specific timing point; or when a specific event occurs. The detection and execution unit information 335 and 345 registered in the management and instruction unit 320 may be updated only when the registered information is changed. It should be understood that the detection and execution unit information 335 and 345, stored in the memory of the detection and execution units 330 and 340, may be altered or deleted according to a user's input.

Therefore, the management and instruction unit 320 may store the received detection and execution unit information 335 and 345 and the received target unit information 315 regarding the target unit 310, according to corresponding main identification information.

Figure 4:
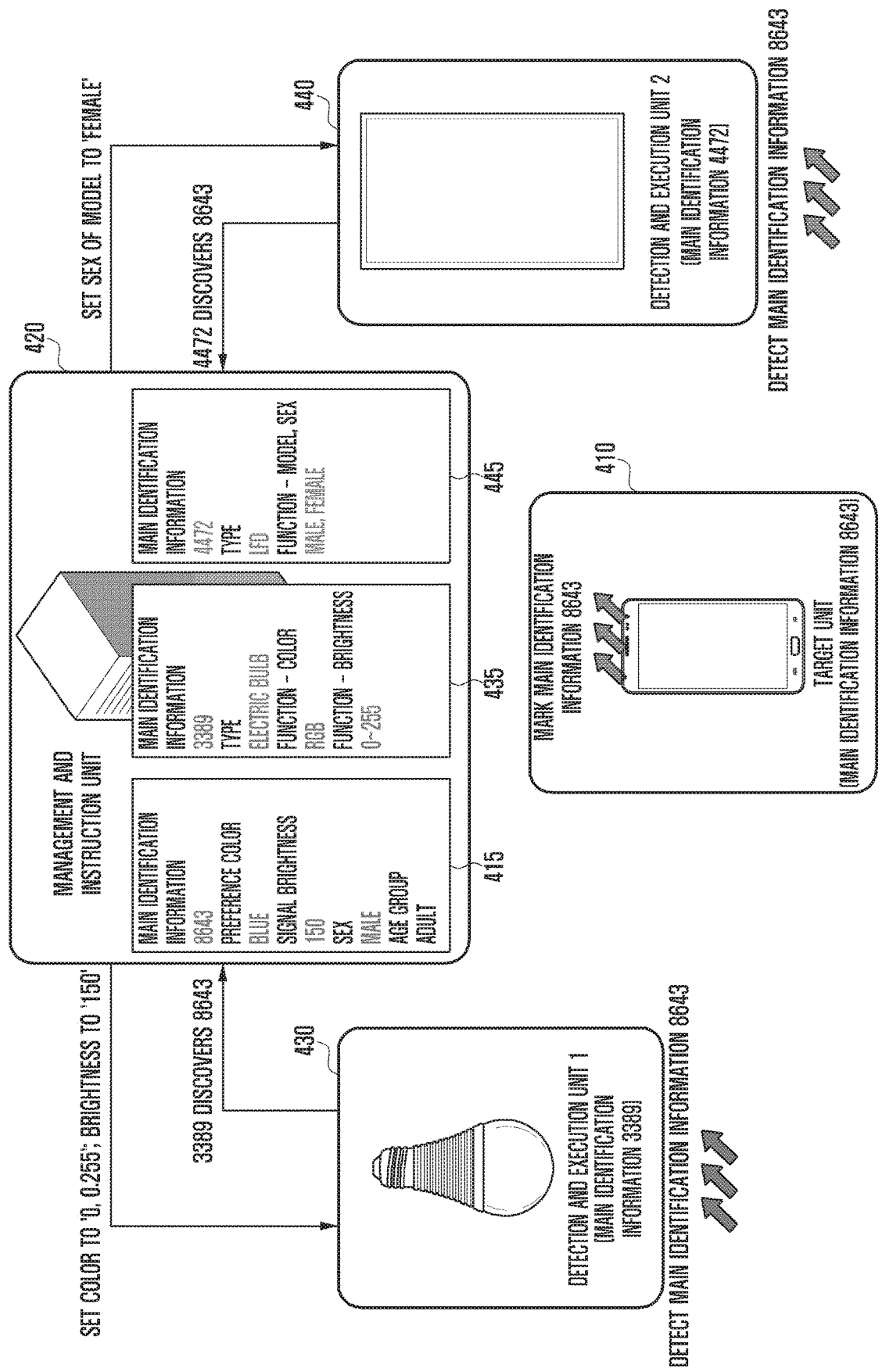
FIG. 4 is a diagram showing an example of a user-customized service providing process in a user-customized service providing system according to an embodiment of the present invention.

FIG. 4 is a diagram showing an example of a user-customized service providing process in a user-customized service providing system according to an embodiment of the present invention.

With reference to FIG. 4, the management and instruction unit 420 receives the target unit information 415, and the detection and execution unit information 435 and 445 according to the information registration procedure described above, and stores the received information, according to the main identification information.

After that, the target unit 410 is capable of transmitting a signal including, e.g., its main identification information. That is, the target unit 410 is capable of advertising a request signal (in the following description, the term 'signal' may be exchanged with 'message') so that functions of its nearby detection and execution units 430 and 440 are performed as its preference functions. The request signal may include information requesting the detection and execution units 430 and 440 to provide a user-customized service or may include only the main identification information regarding the target unit 410.

If the detection and execution units 430 and 440 receives, from the target unit 410, the main identification information regarding the target unit 410, it may transmit, to the management and instruction unit 420, a signal or message including the detected main identification information regarding the target unit 410 along with its main identification information.

With reference to FIG. 4, the target unit 410 is capable of advertising its main identification information. In this case, information indicating that the main identification information is '8643' may be included. In this case, the main identification information regarding the target unit 410 may be detected by a first detection and execution unit 430 and a second detection and execution unit 440. The embodiment shown in FIG. 4 is implemented in such a way that two detection and execution units 430 and 440 detect main identification information regarding the main unit 410; however, the present invention is not limited thereto. It would be appreciated that the embodiment may be implemented in such a way as to include two or more main units and one or three or more detection and execution units.

The first detection and execution unit 430 and the second detection and execution unit 440 are capable of transmitting, to the management and instruction unit 420, their main identification information, along with '8643' as the main identification information regarding the detected target unit 410. That is, the first detection and execution unit 430 transmits, to the management and instruction unit 420, a signal including its main identification information '3389', along with the main identification information '8643' regarding the target unit 410, and informs the management and instruction unit 420 of a target unit detected by a detection and execution unit. Similarly, the second detection and execution unit 440 transmits, to the management and instruction unit 420, a signal including its main identification information '4472', along with main identification information '8643' regarding the target unit 410.

After receiving the main identification information regarding the detection and execution units 430 and 440 along with the main identification information regarding target unit 410 from the detection and execution units 430 and 440, the management and instruction unit 420 is capable of detecting target unit information 415 regarding the target unit 410 corresponding to the received main identification information regarding the target unit. After that, the management and instruction unit 420 is capable of detecting detection and execution unit information 435 and 445 regarding corresponding detection and execution units 430 and 440, using the main identification information regarding the detection and execution units 430 and 440 that have transmitted information including the main identification information regarding the target unit 410 to the management and instruction unit 420. The management and instruction unit 420 processes the detected target unit information 415 the detection and execution unit information 435 and 445, and instructs tasks that corresponding detection and execution unit 435 and 445 and another specific detection and execution unit need to perform. In this case, the specific detection and execution unit may be at least one of the following: another detection and execution unit within a critical distance, apart from the detected detection and execution units 430 and 440, and detection and execution units which are expected to detect a corresponding target unit.

The management and instruction unit 420 performs operation tasks which are various and have a relatively high degree of complexity, processes information transmitted by a number of detection and execution units 430 and 440, rapidly and respectively, and transmits the results to corresponding detection and execution units 430 and 440.

The detection and execution units 430 and 440 receive signals from the management and instruction unit 420, and perform functions corresponding to commands included in the received signals.

With reference to FIG. 4, the management and instruction unit 420 receives, from the first detection and execution unit 430, a signal including main identification information '3389' regarding the first detection and execution unit 430, along with the main identification information '8643' regarding the target unit 410, and detects target unit information 415 corresponding to main identification number '8643' among at least one piece of stored target unit information. The management and instruction unit 420 detects the detection and execution unit information 435 corresponding to the main identification number '3389' among at least one piece of stored detection and execution unit information. In this case, the management and instruction unit 420 is capable of recognizing blue as a preference color and '150' as a preference level of brightness, via the target unit information 415 regarding the target unit 410. The management and instruction unit 420 is also capable of recognizing an electric bulb whose executable function is color change and brightness change, via the detection and execution unit information 435 regarding the first detection and execution unit 430. Based on the information, the management and instruction unit 420 is capable of transmitting, to the first detection and execution unit 430, a signal including information that instructs the first detection and execution unit 430 to set color to blue and brightness to '150.'

If the management and instruction unit 420 receives, from the second detection and execution unit 440, a signal including the main identification information '4472' regarding the second detection and execution unit 440, along with the main identification information '8643' regarding the target unit 410, it is capable of detecting target unit information 415 corresponding to the main identification number '8643' among at least one piece of store target unit information. The management and instruction unit 420 is capable of detecting detection and execution unit information 445 corresponding to the main identification number '4472' among at least one piece of stored detection and execution unit information. In this case, the management and instruction unit 420 is capable of recognizing that the distinction of sex is male and the age group is adult, via the target unit information 415 regarding the target unit 410. The management and instruction unit 420 is capable of recognizing an LFD whose executable function is two models of different sex which are prepared for advertisement for the same goods, respectively, via the detection and execution unit information 445 regarding the second detection and execution unit 440. Based on the information, the management and instruction unit 420 considers content that human is generally more attracted to a person of the other sex than a person of the same sex, according to a determination standard that has been stored, and determines that it is suitable to display a female model advertisement of the two types of advertisement prepared in the second detection and execution unit 440. The management and instruction unit 420 is capable of transmitting, to the second detection and execution unit 440, a signal including information instructing to display an advertisement as a female advertisement model.

As shown in FIG. 4, if one target unit 410 is detected by a number of detection and execution units 430 and 440, the management and instruction unit 420 performs operation tasks which are various and have a relatively high degree of complexity, processes information transmitted by a number of detection and execution units 430 and 440, rapidly and respectively, and transmits a signal including information regarding functions to be performed to corresponding detection and execution units 430 and 440.

Although it is not shown, the embodiment shown in FIG. 4 may include a third detection and execution unit, near the first detection and execution unit 430, which has not detected main identification information advertised by the target unit 410 or will be expected to detect the target unit 410. In this case, the management and instruction unit 420 transmits a signal instructing the settings of the color and brightness of an electric bulb to the first detection and execution unit 430, as described above, and simultaneously, a signal to perform a specific function to the third detection and execution unit near the first detection and execution unit 430. For example, the third detection and execution unit is a TV, and channel changeable information has been registered in the management and instruction unit 420. In this case, the management and instruction unit 420 is capable of recognizing that the distinction of sex is male according to the target unit information 415 regarding the target unit 415. If the distinction of sex is male, the embodiment considers that men are interested in sports channels, and transmits a signal instructing the channel change to a sports channel to the third detection and execution unit. In this case, although the third detection and execution unit has not detected the target unit 410, it is capable of enabling the management and instruction unit 420 to provide services to fit the user of the target unit 410.

In this case, the nearby detection and execution unit is referred to as a detection and execution unit within a critical distance which is described above. In an embodiment, the management and instruction unit 420 is capable of including location information regarding corresponding detection and execution units 430 and 440 in the detection and execution unit information 435 and 445. Alternatively, the detection and execution unit information 435 and 445 may have, as a related value, main identification information regarding another detection and execution unit located within a distance, near corresponding detection and execution units 430 and 440.

Figure 5:
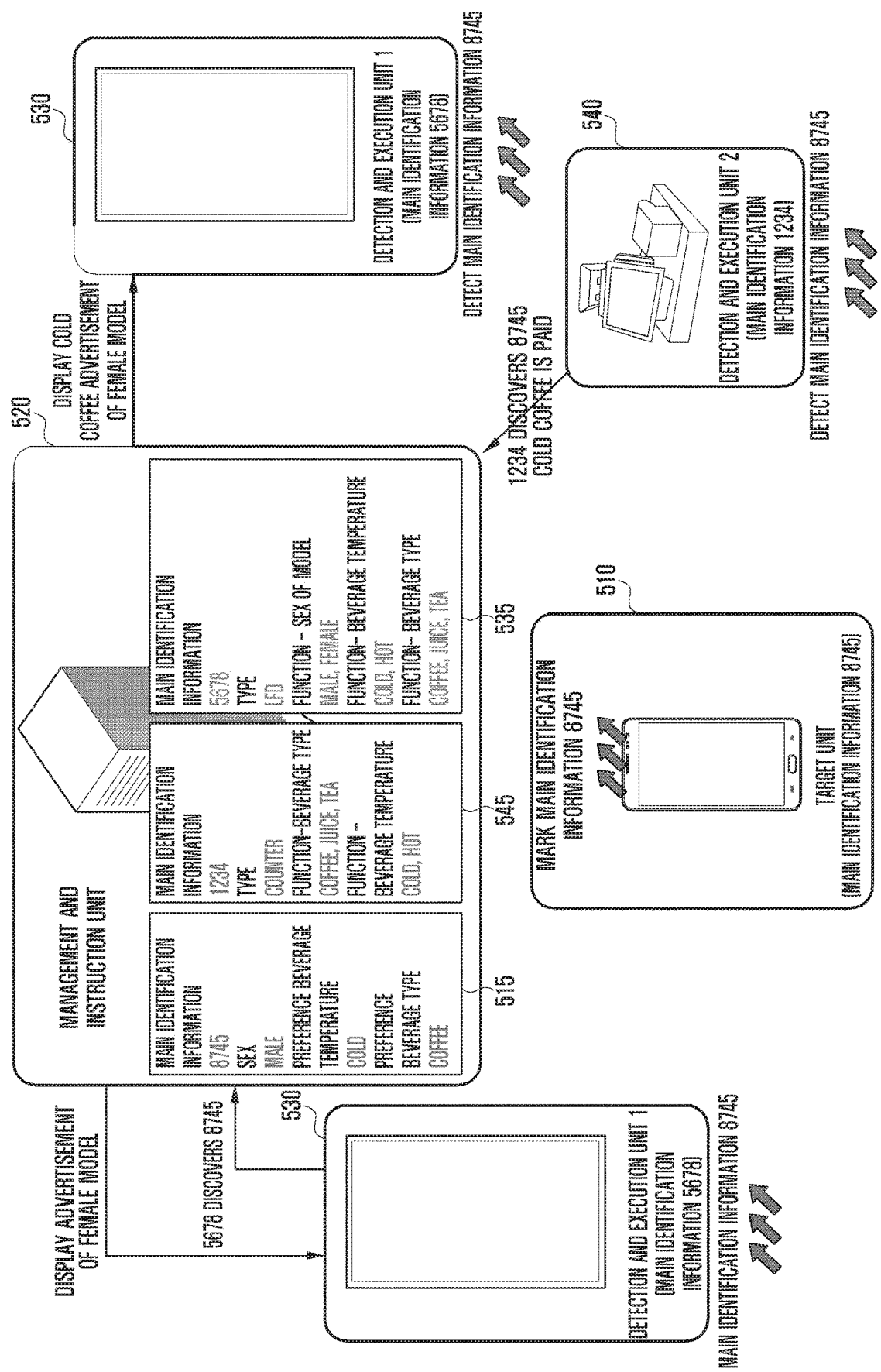
FIG. 5 is a diagram showing another example of an information registration process and a user-customized service providing process in a user-customized service providing system according to an embodiment of the present invention.

FIG. 5 is a diagram showing another example of an information registration process and a user-customized service providing process in a user-customized service providing system according to an embodiment of the present invention.

With reference to FIG. 5, like the section described above with reference to FIG. 3, the target unit 510 is capable of registering target unit information 515 including the main identification information regarding the target unit 510 in the management and instruction unit 520. In addition, the detection and execution units 530 and 540 are capable of registering, in the management and instruction unit 520, detection and execution unit information 535 and 545 including the main identification information regarding the detection and execution units 530 and 540.

In this case, the detection and execution units 530 and 540 are capable of enabling the management and instruction unit 520 to collect and accumulate target unit information 515 regarding the target unit 510 and detection and execution unit information 535 and 545 regarding the detection and execution units 530 and 540. That is, the detection and execution units 530 and 540 are capable of transmitting, to the management and instruction unit 520, information to change or update the target unit information 515 regarding the target unit 510, according to its performed function. More specifically, the management and instruction unit 520 is capable of collecting frequently created information regarding the specific target unit 510 and the detection and execution units 530 and 540.

With reference to FIG. 5, the second detection and execution unit 540 may be a reception counter. In this case, if a payment for goods is made at a reception counter, the second detection and execution unit 540 is capable of detecting main identification information regarding one or more target units 510, whose indication of another degree of proximity is greater than or equal to a preset value or network signal of strength greater than or equal to a threshold, which can be recognized by the second detection and execution unit 540. In this case, the target unit 510 may have been advertising its main identification information.

After that, the second detection and execution unit 540 is capable of transmitting, to the management and instruction unit 520, information that can be recognized by the second detection and execution unit 540, such as main identification information regarding the detected target unit 510, information regarding paid goods, a payment time, etc., along with the main identification information regarding the second detection and execution unit 540. For example, if a payment of cold coffee is made by the second detection and execution unit 540, the second detection and execution unit 540 is capable of transmitting, to the management and instruction unit 520, detected main identification number '8745' regarding the target unit 510, its main identification number '1234', and information that a payment of cold coffee has been made.

Therefore, the management and instruction unit 520 is capable of changing or updating target unit information 515 regarding the target unit 510, using the received information. For example, the management and instruction unit 520 is capable of receiving information that a cold coffee payment has been made by the target unit 510 from the second detection and execution unit 540, and adding, to the target unit information 515, information indicating that a preference beverage is 'coffee' and temperature of the preference beverage is 'cold'.

Meanwhile, the management and instruction unit 520 may alter the target unit information 515 and/or detection and execution unit information 535 and 545 for frequently created information from the detection and execution units 530 and 540. In this case, ascertaining that information is frequently created may be a case that the determination is greater than or equal to a preset threshold. Alternatively, the determination may also be made based on thresholds varying depending on a user's inputs or thresholds set depending on types of the detection and execution units 530 and 540.

Information directly or indirectly collected by the target unit 510 and information collected by the detection and execution units 530 and 540 is accumulated in the management and instruction unit 520. The accumulated information may be used to determine an operation that corresponding detection and execution units 530 and 540 need to perform if the detection and execution units 530 and 540 recognize the specific target unit 510.

For example, it is assumed that a payment of 'cold coffee' is frequently made by the target unit 510, and the second detection and execution unit 540 adds information indicating that preference beverage is 'coffee' and temperature of preference beverage is 'cold' to the target unit information 515. In this case, before the information is added to the target unit information 515, the target unit information 515 has only included information indicating that the distinction of sex is 'male.' Therefore, if the first detection and execution unit 530 detects main identification information regarding the target unit 510, the management and instruction unit 520 has just instructed to display 'an advertisement of a female model'. However, if information indicating that the target unit 510 prefers 'cold coffee' is included in the target unit information 515 by the second detection and execution unit 540, and the first detection and execution unit 530 detects again the main identification information regarding the target unit 510, the management and instruction unit 520 is capable of instructing to display a detailed advertisement, 'a cold coffee advertisement of a female model'.

In this case, the detection and execution units 530 and 540 operate adaptively according to a variable degree of preference of the user 510, which is advantageous.

Meanwhile, in an embodiment, the management and instruction unit 520 may also obtain information regarding items sold in a specific time slot from the second detection and execution unit 540. The management and instruction unit 520 may use the information to set functions of another detection and execution unit 530. For example, if a payment of 'cold coffee' is frequently made by the second detection and execution unit 540 between 1 p.m. to 2 p.m., the information may be transmitted to the management and instruction unit 520. The management and instruction unit 520 may transmit, to an LFD as the first detection and execution unit 530, a signal so that 'cold coffee' advertisement can be performed between 1 p.m. to 2 p.m., based on the information.

Figure 6:
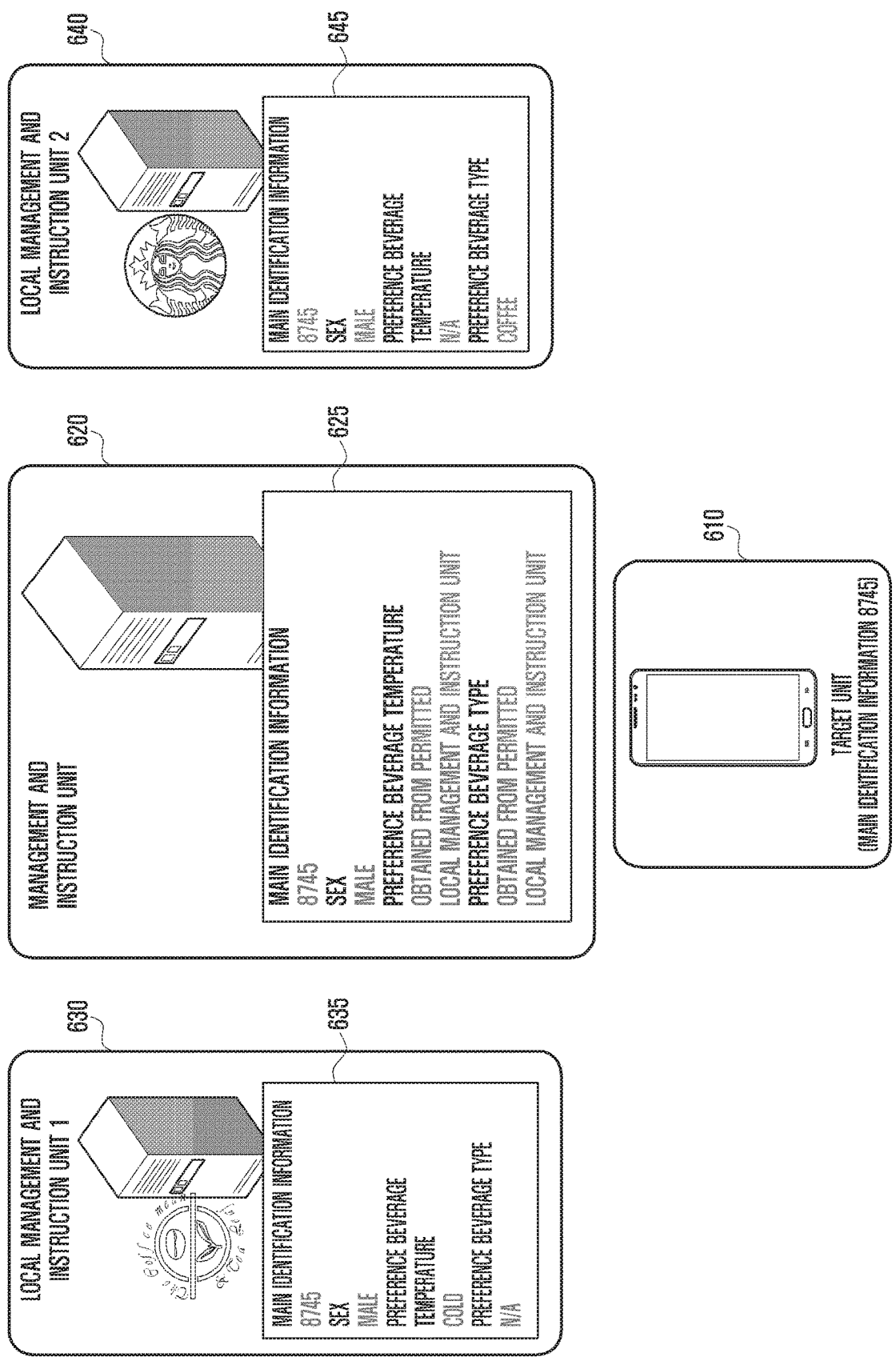
FIG. 6 is a diagram showing an example of a method of managing target unit information according to an embodiment of the present invention.

FIG. 6 is a diagram showing an example of a method of managing target unit information according to an embodiment of the present invention.

In a process where a management and instruction unit determines an execution command to be transmitted to a detection and execution unit, using target unit information and detection and execution unit information, part of the information regarding the target unit is only used to determine an instruction for a specific detection and execution unit.

For example, it is assumed that there are two detection and execution units which are in a competitive relationship. In this case, if there is information that detection and execution units have accumulated for the same target unit, respectively, the detection and execution units may not want to use their accumulated information in a process to determine an instruction to be transmitted to a competition detection and execution unit. If specific information that the detection and execution unit has collected for the target unit is information that needs to be collected under the clear permission of the target unit, the information needs to be used only to determine an instruction for the detection and execution unit that has acquired corresponding permission.

Therefore, there may be a method that limits the management and instruction unit in using corresponding information only to determine an instruction for the specific detection and execution unit, according to each unit of information regarding the management and instruction unit.

With reference to FIG. 6, the storage function can be performed by only one or more specific detection and execution units, and there may be a structure of a local management and instruction unit that a management and instruction unit can access according to only the instruction and the determination by a corresponding detection and execution unit. In this case, each local management and instruction unit separately stores and manages information regarding the target unit, determines an execution command for the target unit, and makes an instruction.

More specifically, if a target unit 610 exists, target unit default information 625 regarding the target unit 610 may be stored in the management and instruction unit 620. In this case, there may be part of the information regarding the target unit which needs to be used by only each detection and execution unit (not shown). For example, there may be a first detection and execution unit and a second detection and execution unit, and the two detection and execution units may be in a competitive relationship. As described above, there may be information which needs a user's clear permission.

In this case, the first detection and execution unit may obtain information indicating that a user of the target unit 610 frequently drinks cold beverage. In a process where the target unit 610 registers target unit information in the management and instruction unit 620, the target unit 610 may register the information including an instruction to only use the information indicating that the user frequently drinks cold beverage in the process to determine a command for the first detection and execution unit. In this case, a first local management and instruction unit 630 for the first detection and execution unit may exist separately, and the first local management and instruction unit 630 may store additional information 635 regarding the target unit. If the first detection and execution unit detects the target unit 610, it may use the additional information 635 regarding the target unit, stored in the first local management and instruction unit 630, in order to determine a command for the first detection and execution unit.

Similarly, the second detection and execution unit may obtain information indicating that a user of the target unit 610 prefers coffee. In this case, a second local management and instruction unit 640 for the second detection and execution unit may exist separately, and the second local management and instruction unit 640 may store additional information 645 regarding the target unit. If the second detection and execution unit detects the target unit 610, it may use the additional information 645 regarding the target unit, stored in the second local management and instruction unit 430, in order to determine a command for the second detection and execution unit.

Meanwhile, the embodiment shown in FIG. 6 is implemented in such a way that the local management and instruction units 630 and 640 separately register and store target unit additional information 635 and 645 for detection and execution units, respectively, however, the present invention is not limited thereto. For example, one management and instruction unit 620 may store target unit additional information 635 and 645, along with target unit default information 625 regarding the target unit 610. In this case, the target unit additional information 635 and 645 may further include information regarding the detection and execution unit that can use the target unit additional information 635 and 645. If local management and instruction units 630 and 640 exist separately, the target unit additional information 635 and 645 may further include information regarding the detection and execution unit that can use the target unit additional information 635 and 645.

Figure 7:
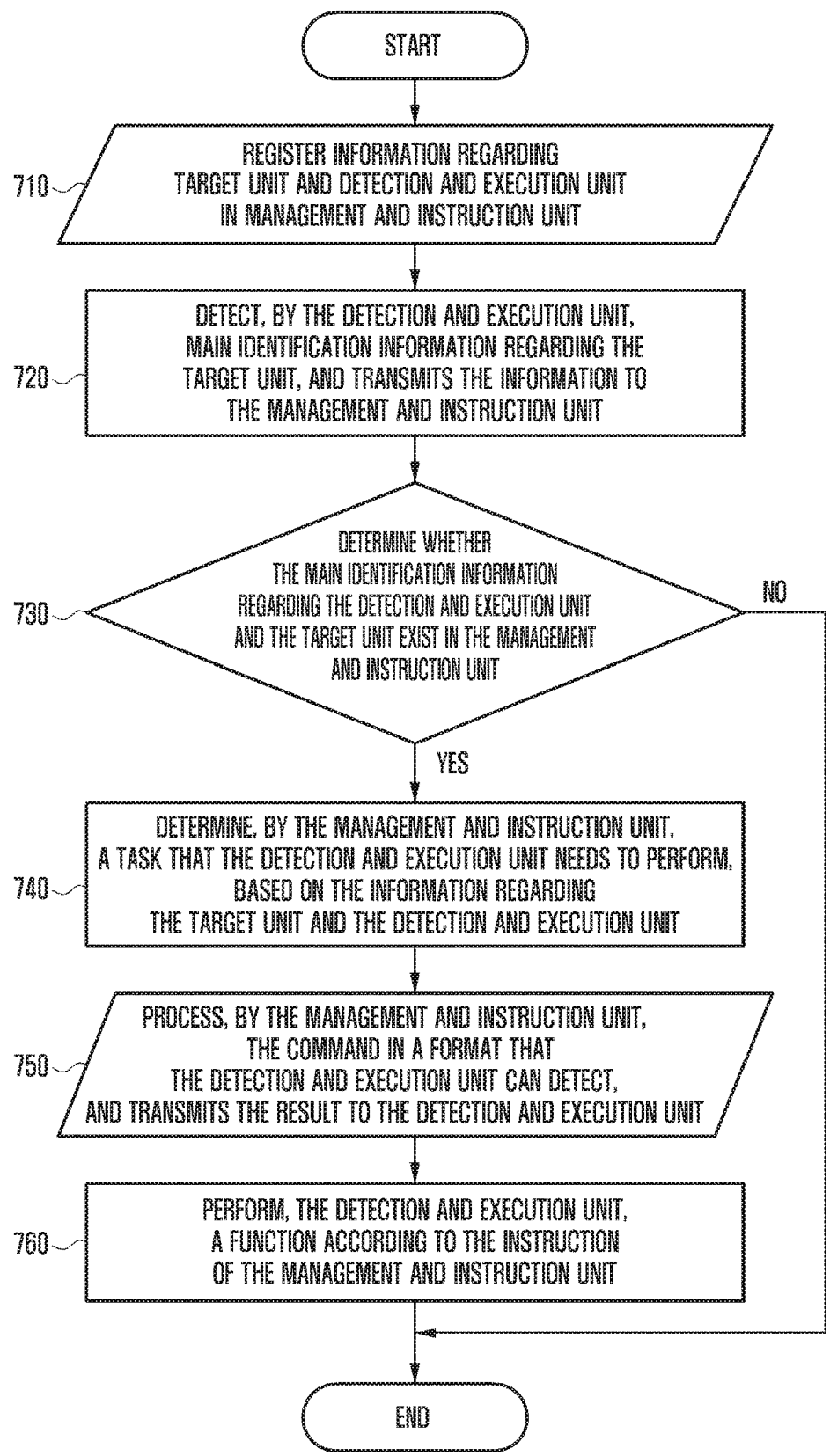
FIG. 7 is a flowchart that describes an example of a user-customized service providing process in a user-customized service providing system according to an embodiment of the present invention.

FIG. 7 is a flowchart that describes an example of a user-customized service providing process in a user-customized service providing system according to an embodiment of the present invention.

With reference to FIG. 7, the target unit is capable of registering target unit information in a management and instruction unit in operation 710. The detection and execution unit is capable of registering detection and execution unit information in the management and instruction unit. Since this was described above, a detailed description is omitted below.

After that, the target unit is capable of transmitting (advertising) a signal including main identification information regarding the target unit, and the detection and execution unit is capable of detecting the transmitted main identification information regarding the target unit in operation 720. If the detection and execution unit detects the main identification information regarding the target unit, it is capable of transmitting, to the management and instruction unit, its main identification information (i.e., main identification information regarding the detection and execution unit), along with the detected main identification information regarding the target unit. Since this was described above, a detailed description is omitted below.

The management and instruction unit determines whether the main identification information regarding the detection and execution unit and main identification information regarding the target unit, received from the detection and execution unit, is stored in operation 730. If the received main identification information regarding the target unit and the main identification information regarding the detection and execution unit has not been stored in operation 730, the process is ended.

On the other hand, if the received main identification information regarding the target unit and the main identification information regarding the detection and execution unit has been stored in operation 730, the management and instruction unit is capable of determining a task that the detection and execution unit needs to perform, based on the target unit information and the detection and execution unit information in operation 740. Since this was described above, a detailed description is omitted below.

The management and instruction unit processes a command for a task that the detection and execution unit needs to perform in a format that the detection and execution unit can detect, and then transmits a signal including the information to the detection and execution unit in operation 750.

The detection and execution unit is capable of performing a function corresponding to the instruction of the management and instruction unit in operation 760.

Meanwhile, the processes of transmitting main identification information regarding the target unit, i.e., UE, and providing a user-customized service may be used for the process of providing a service and information useful for the user without a user's clear request. In this case, according to an embodiment, UE provides a gateway with the identification information (e.g., main identification information regarding the target unit). The gateway is capable of forwarding, to a server including information regarding the user, a user information request signal including identification information regarding the UE. The gateway receives, from the server, user information related to the identification information regarding the UE, and provides information and a service according to its purpose. In this case, information regarding the server storing identification information regarding UE and user information may be information created before the gateway requests user information. Therefore, a method of providing a micro-location service to fit a user's real-time situation (e.g., a user's current taste, intention, behavior purpose, location, etc.) is described below.

According to an embodiment of the present invention, a method of providing a user-customized micro-location service, based on location, includes the following processes: detecting and transmitting a user's real-time situation; simultaneously transmitting, by UE, sound and Radio Frequency (RF), and identifying a distance and an obstacle; determining, by a gateway, a behavior according to the user's real-time situation; and transmitting information to the UE or providing a service via an executer. A detailed description is provided below.

Figure 8:
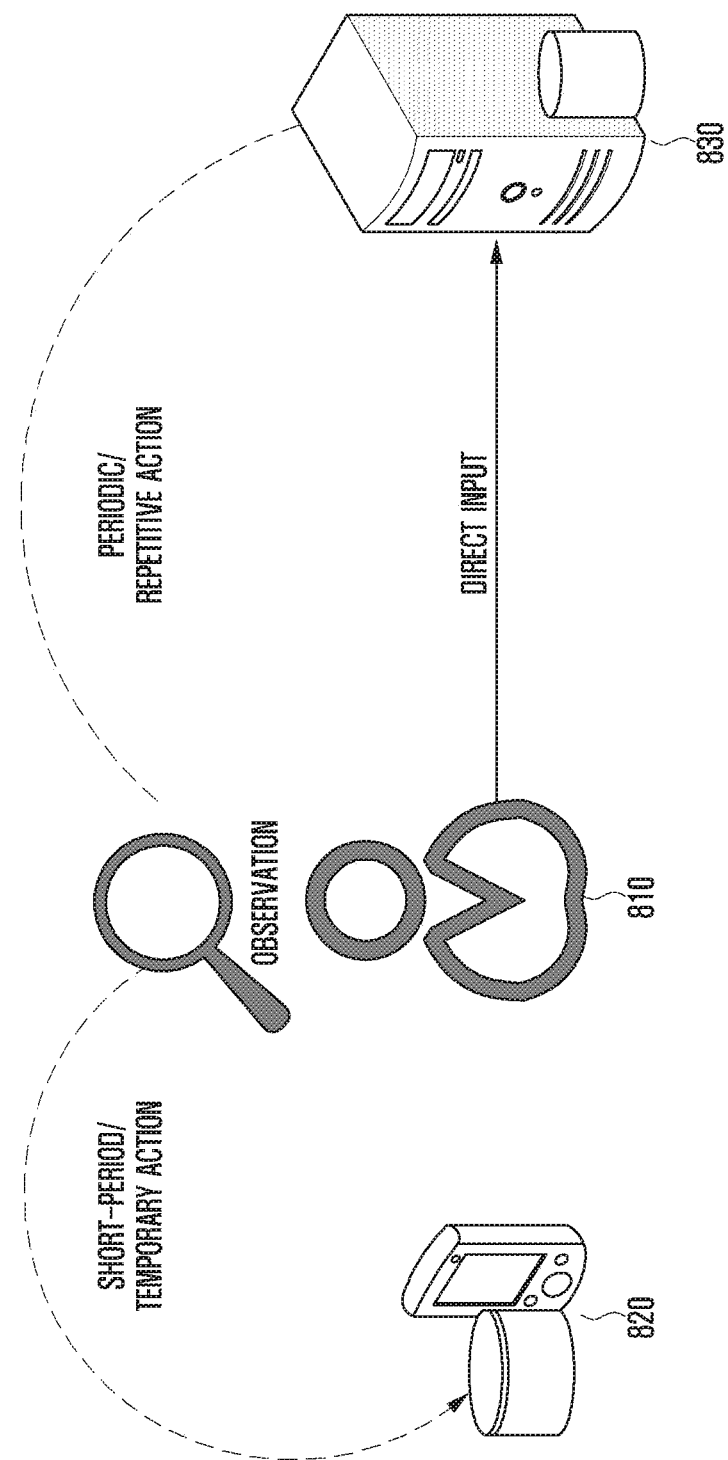
FIG. 8 is a diagram showing an example of a process of transmitting a user's real-time situation according to an embodiment of the present invention.

FIG. 8 is a diagram showing an example of a process of transmitting a user's real-time situation according to an embodiment of the present invention.

With reference to FIG. 8, user 810 directly inputs, to a server 830, his/her information, taste, intention, behavior purpose, location, etc. UE 820 observes the behaviors of the user 810. Short-period and/or temporary behaviors according to types of observed information may be stored in UE 820. In order to store periodical and/or repetitive behaviors are stored in the server 830, UE 820 transmits, to the server 830, a storage message including information regarding corresponding behaviors.

Figure 9:
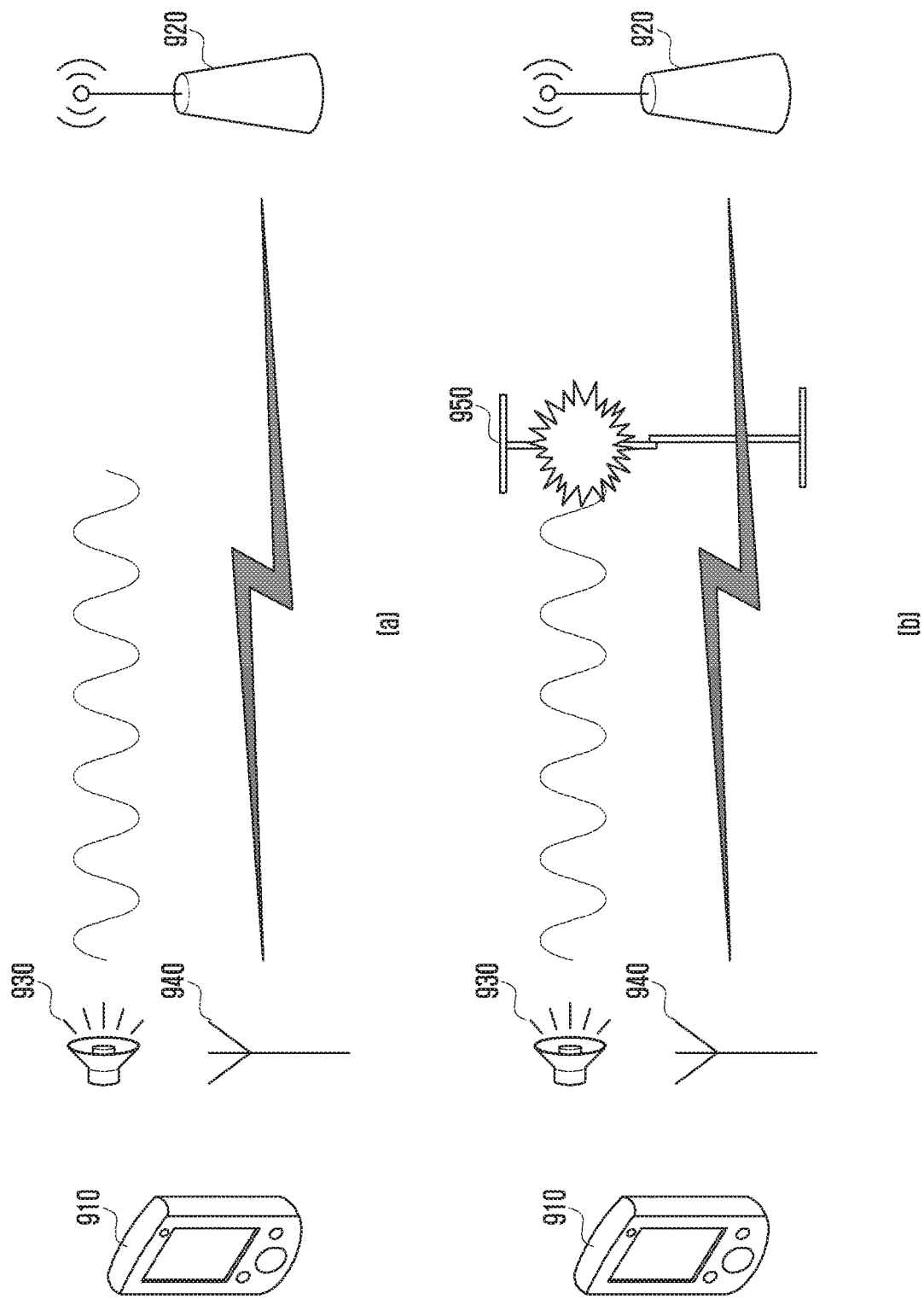
FIG. 9 is a diagram showing an example of a process for UE to simultaneously transmit sound and a radio signal, Radio Frequency (RF), and to check the distance and an obstacle according to an embodiment of the present invention.

FIG. 9 is a diagram showing an example of a process for UE to simultaneously transmit sound and a radio signal, Radio Frequency (RF), and to check the distance and an obstacle according to an embodiment of the present invention.

With reference to FIG. 9 (*a*), if UE 910 simultaneously transmits sound 930 and RF 940, a gateway 920 is capable of measuring a distance between the UE 910 and the gateway 920 via the time difference of arrival of signals.

As shown in FIG. 9 (*b*), if there is an obstacle 950 such as a wall, a window, etc. is between UE 910 and the gateway 920, sound may have a relatively small obstacle transmittance, such as wall, window, etc., less than that of RF. Therefore, the gateway 920 is capable of receiving RF, but may not receive sound. In this case, the gateway 920 ascertains that there is an obstacle 950 such as a wall, a window, etc. between UE 910 and the gateway 920.

Figure 10:
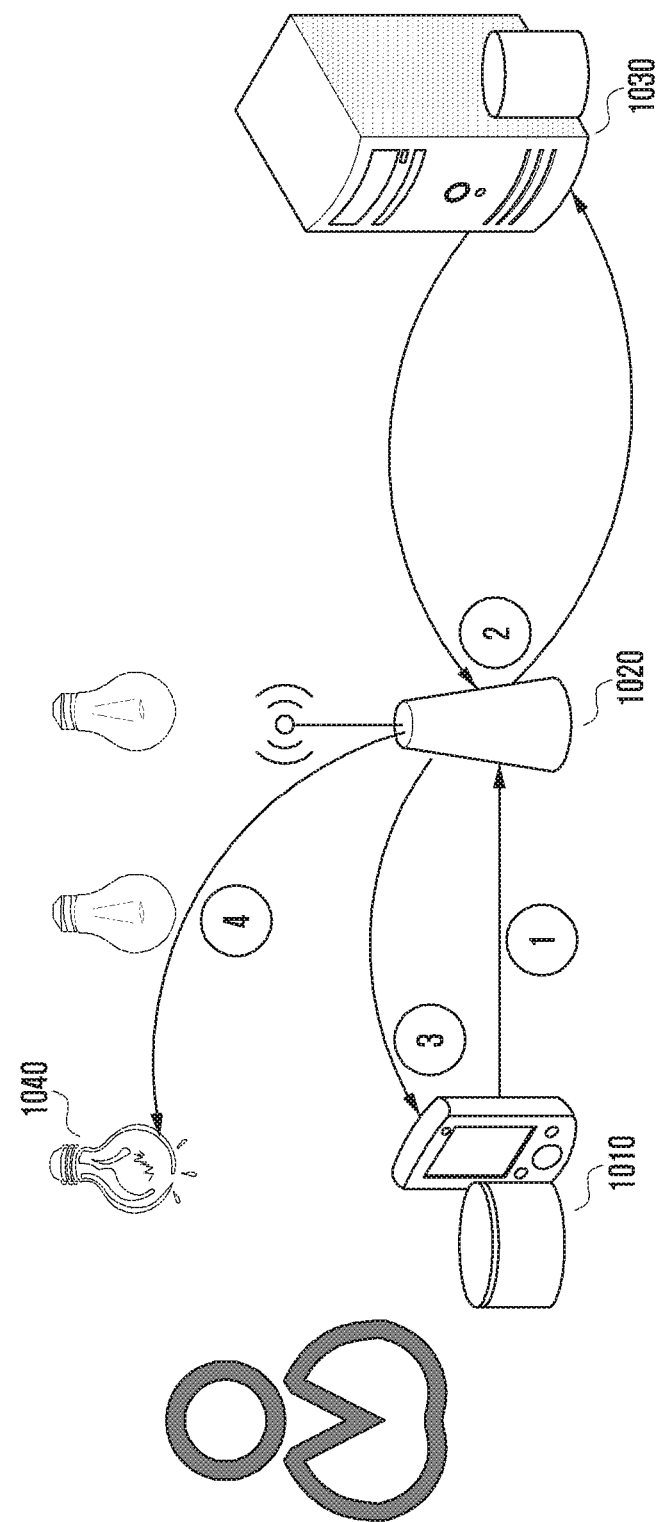
FIG. 10 is a diagram showing an example of a method of providing a user-customized micro-location service, based on location, according to an embodiment of the present invention.

FIG. 10 is a diagram showing an example of a method of providing a user-customized micro-location service, based on location, according to an embodiment of the present invention.

With reference to FIG. 10, a gateway 1020 is capable of receiving, from UE 1010, identification information, and short-period and/or temporary taste information. The gateway 1020 is capable of determining a distance from UE 1010 and a condition as to whether it is spatially separated from UE 1010 by an obstacle, via sound and RF signals simultaneously transmitted by UE 1010 (1). The gateway 1020 is capable of making via various types of inquiries to a server 1030 and receiving periodic and/or repetitive taste information, based on short-period/temporary taste information and a distance/spatial separation information (2). After that, according to an embodiment, the gateway 1020 is capable of transmitting the collected information to UE 1010 (3). Alternatively, the gateway 1020 is capable of selecting an executer suitable for the location of UE 1010 (e.g., an electric bulb as shown in FIG. 10), and providing a service. For example, for an electric bulb close to UE 1010 according to locations of UE 1010, the gateway 1020 is capable of instructing the change of settings according to a user's real-time situation information. That is, the gateway may adjust brightness of an electric bulb close to UE 1010 to a user's preference level of brightness, or may change the color of the electric bulb.

For example, if UE 1010 advertises identification information with BLE, the gateway (or IoT) 1020 is capable of discovering a user. After the discovery, if the gateway 1020 receives a short-period/temporary sound signal, it is capable of performing a specific action/execution (e.g., a door opening action). A distance is measured via sound, and distinctive services are provided as a server according to distances transmits another information.

In the following description, an additional information providing process according to embodiment of the present invention is explained with reference to FIG. 11. For example, the additional information may include a push service, coupon information, map information, etc. A push service is referred to as a technology that is capable of automatically or periodically providing the latest information regarding an information list that a user has concern for, or an automation technology that is capable of transmitting specific information to a user although the user does not request information, manually, every time. In the following description, additional information is described based on push information, but is not limited to the push information.

Figure 11:
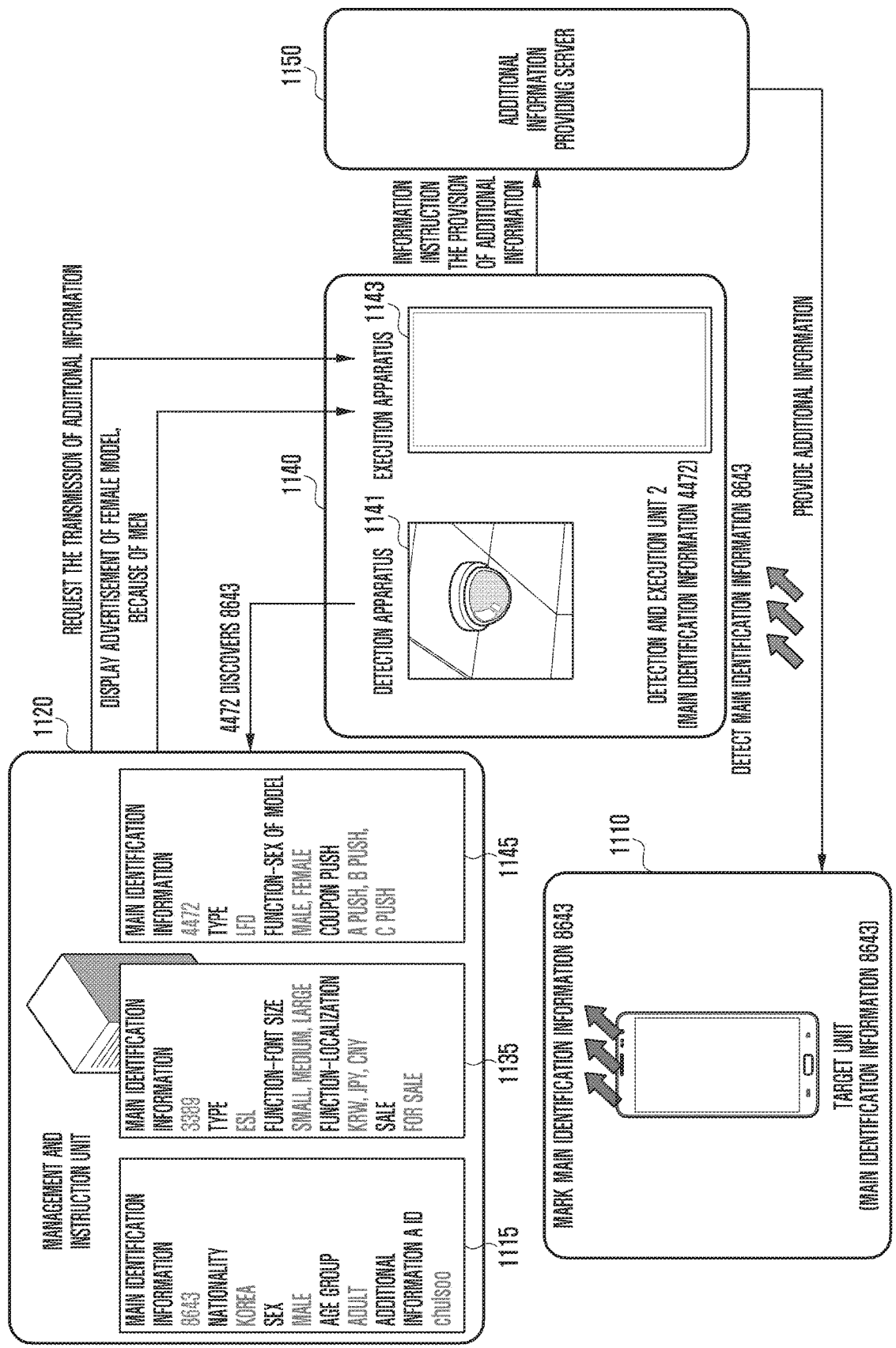
FIG. 11 is a diagram showing an example of an additional information providing process in a user-customized service providing system according to an embodiment of the present invention.

FIG. 11 is a diagram showing an example of an additional information providing process in a user-customized service providing system according to an embodiment of the present invention.

With reference to FIG. 11, a user-customized service providing system is capable of including at least one target unit 1110, at least one management and instruction unit 1120, at least one detection and execution unit 1140, and at least one additional information providing server 1150. Each of the configuration units 1110, 1120, 1140, and 1150 is a conceptual term, and may be implemented with a number of devices. The detection and execution unit 1140 may be implemented to include a detection apparatus 1141 for performing the detection function and an execution apparatus 1143 for performing the execution function. The detection apparatus 1141 and the execution apparatus may be separately configured to the system, without being included in the detection and execution unit 1140.

One configuration unit and another configuration unit may be physically integrated into one apparatus. Therefore, the detection and execution unit 1140 and the management and instruction unit 1120 may be the same apparatus, physically.

The target unit 1110 and the detection and execution unit 1140 may support a service for providing additional information. The service for providing additional information may include a push service. The additional information providing server 1150 may be an entity which is separated from the detection and execution unit 1140. The additional information providing server 1150 may be an entity included in the detection and execution unit 1140.

With reference to FIG. 11, the configuration of the user-customized service providing system may also be applied to other embodiments described above, in the same way.

The management and instruction unit 1120 is capable of receiving target unit information 1115, detection and execution unit information 1135 and 1145, according to the information registration procedure described above, and storing the received information according to main identification information.

After that, the target unit 1110 is capable of transmitting a signal including. e.g., its main identification information. That is, the target unit 1110 is capable of advertising a request signal (in the following description, the term 'signal' may be exchanged with 'message') so that functions of its nearby detection and execution unit 1140 are performed as its preference functions. The request signal may include information requesting the detection and execution unit 1140 to provide a user-customized service or may include only the main identification information regarding the target unit 1110. For example, the request signal may carry main identification information 8643.

If the detection and execution unit 1140 receives, from the target unit 1110, the main identification information regarding the target unit 1110, it may transmit, to the management and instruction unit 1120, a signal or message including the detected main identification information regarding the target unit 1110 along with its main identification information. The detection and execution unit 1140 is capable of transmitting, to the management and instruction unit 1120, a signal including its main identification information 4412 along with main identification information 8643 regarding the target unit 1110, and enabling the management and instruction unit 1120 to recognize a detection and execution unit and a target unit detected by the detection and execution unit. The operation of the detection and execution unit 1140 described above may be performed by the detection apparatus 1141. If the detection and execution unit 1140 is configured in such a way as to include the detection apparatus 1141 and the execution apparatus 1143 which are separated from each other, or if the detection apparatus 1141 and the execution apparatus 1143 are configured as entities separated from the detection and execution unit 1140, the detection apparatus 1141 may perform the reception of the main identification information regarding the target unit 1110 and the transmission of the main identification information regarding the target unit 1110 and the main identification information regarding the detection and execution unit 1140 to the management and instruction unit 1120.

The management and instruction unit 1120 receives, from the detection and execution unit 1140, main identification information regarding the detection and execution unit 1140 along with the main identification information regarding the target unit 1110, and detects target unit information 1115 regarding the target unit 1110 corresponding to the received main identification information regarding the target unit. After that, the management and instruction unit 1120 detects detection and execution unit information 1145 regarding the corresponding detection and execution unit 1140, using main identification information regarding the detection and execution unit 1140 that has transmitted, to the management and instruction unit 1120, information including the main identification information regarding the target unit 1110. The management and instruction unit 1120 processes the detected target unit information 1115 and the detection and execution unit information 1145, and indicates a task that corresponding detection and execution unit 1145 and another specific detection and execution unit need to perform. For example, the management and instruction unit 1120 may indicate an additional information providing task or a task related to the push service providing operation.

The management and instruction unit 1120 is capable of recognizing that the distinction of sex is male and additional information A ID is chulsoo, via the target unit information 1115 regarding the target unit 1110. The additional information A ID may include identification information (identifier) regarding the target unit 1110 or the target unit user, with respect to, e.g., an additional information providing server 1150 (e.g., a push server A). In addition, the management and instruction unit 1120 is capable of recognizing an LFD: whose executable function is two models of different sex which are prepared for advertisement for the same goods, respectively, via the detection and execution unit information 1145 regarding the detection and execution unit 1140; and that supports a push function. The push function is to provide a push service via server A, server B, and server C. In this case, the servers may have push methods which differ from each other, in terms of a push managing server and a push service managing method. For example, the push method may be google cloud messaging (GCM), apple push notification (APNs), etc., but is not limited thereto.

The management and instruction unit 1120 is capable of transmitting instruction information to the detection and execution unit 1140, based on the target unit information 1115 and the detection and execution unit information 1145.

Meanwhile, if the detection and execution unit 1140 is configured in such a way as to include the detection apparatus 1141 and the execution apparatus 1143 which are separated from each other, or if the detection apparatus 1141 and the execution apparatus 1143 are configured as entities separated from the detection and execution unit 1140, the management and instruction unit 1140 is capable of transmitting the instruction information to the execution apparatus 1143. The execution apparatus 1143 is capable of performing a function corresponding to the instruction information received from the management and instruction unit 1120. The following description provides the process for the detection and execution unit 1140 to receive instruction information from the management and instruction unit 1120.

The management and instruction unit 1120 is capable of transmitting, to the detection and execution unit 1140, information instructing the detection and execution unit 1140 to display advertisement for a female model, based on the identified information. A detailed operation refers to the embodiments described above.

The management and instruction unit 1120 is capable of transmitting, to the detection and execution unit 1140, information instructing to perform the transmission of additional information, based on the identified information. The message instructing to perform the transmission of additional information may be information instructing the transmission of push information or instruction information related to the transmission of push information. The push information transmission-related instruction information may be information used for the transmission of push information. The management and instruction unit 1120 may instruct to provide additional information to a corresponding ID, via A push, based on the target unit information 1115 regarding the target unit 1110. The instruction information may instruct to provide additional information to an additional information ID of the target unit 1110. For example, the additional information ID may be a push service ID. That is, the management and instruction unit 1120 may transmit, to a server providing a push function, instruction information instructing the server to provide a push service to a user or a device corresponding to the push service ID.

The detection and execution unit 1140 is capable of controlling the operation of the detection and execution unit 1140, based on the instruction information received from the management and instruction unit 1120. For example, the detection and execution unit 1140 is capable of displaying advertisement for a female model. The detection and execution unit 1140 may also perform operations for a push service.

In order to perform operations for a push service, the detection and execution unit 1140 is capable of transmit instruction information to an additional information providing server 1150 providing a push function, instructing the transmission of push information to the target unit 1110. That is, the detection and execution unit 1140 is capable of transmitting instruction information to an additional information ID of the target unit 1110 (e.g., chulsoo), instructing the transmission of push information. In the embodiment, the additional information providing server 1150 may be server A providing a push function or server A providing additional information.

The push information may be related to services provided by the detection and execution unit 1140. For example, it is assumed that the detection and execution unit 1140 is displaying advertisement for specific goods, based on target unit information 1115 regarding the target unit 1110. In this case, the push information may be push information related to the specific goods. For example, the push information may include information regarding the specific goods (detailed information regarding goods, e.g., price, release date, manufacture date, etc.), store information for purchasing specific goods (business hour information, location information, discount information, etc.), coupon information (discount coupon) for specific goods, etc., but is not limited thereto.

The additional information providing server 1150 may be configured as an entity separated from the detection and execution unit 1140 or may be installed into the detection and execution unit 1140. The detection and execution unit 1140 may use the additional information providing server 1150. If the additional information providing server 1150 and the detection and execution unit 1140 are configured separately, information instructing the transmission of additional information, transmitted by the detection and execution unit 1140, may be transmitted to the additional information providing server 1150.

If the additional information providing server 1150 is installed into the detection and execution unit 1140, the additional information providing server 1150 may transmit information instructing the provision of additional information to an entity for controlling the additional information providing server 1150 in the additional information providing server 1150 or the detection and execution unit 1140.

In another embodiment, information instructing the provision of additional information may be transmitted to the additional information providing server 1150 without passing the detection and execution unit 1140. For example, the management and instruction unit 1120 is capable of directly transmitting, to the additional information providing server 1150, instruction information related to the provision of additional information transmitted to the detection and execution unit 1140, without passing the detection and execution unit 1140.

The additional information providing server 1150 is capable of providing additional information to a device or a user with a corresponding ID, based on the information instructing the transmission of additional information. For example, the additional information providing server 1150 is capable of providing additional information to a device (target unit 1110) or a user with an ID, chulsoo. The additional information may be push information. The target unit 1110 provides a function for receiving additional information. For example, the target unit 1110 is capable of performing the push setup, and receiving push information according to the push setup. For example, the push method may be google cloud messaging (GCM), apple push notification (APNs), etc., but is not limited thereto. The additional information providing server 1150 and the target unit 1110 are capable of providing additional information via a public communication network. The additional information providing server 1150 and the target unit 1110 are directly connected to each other and may receive push information. Direct connection may be achieved by various communication modes, such as, Wi-Fi, Wi-Fi Direct, Bluetooth, device to device, etc., but is not limited thereto.

If the additional information providing server 1150 is installed into the detection and execution unit 1140, the detection and execution unit 1140 is directly connected to the target unit 1110, and provides push information. Direct connection may be achieved by various communication modes, such as, Wi-Fi, Wi-Fi Direct, Bluetooth, device to device, etc., but is not limited thereto.

The target unit 1110 is capable of supporting an additional information providing service or a push service. If the target unit 1110 supports an additional information providing service or a push service, it is capable of receiving push information from the additional information providing server 1150, and using the received information.

Figure 12:
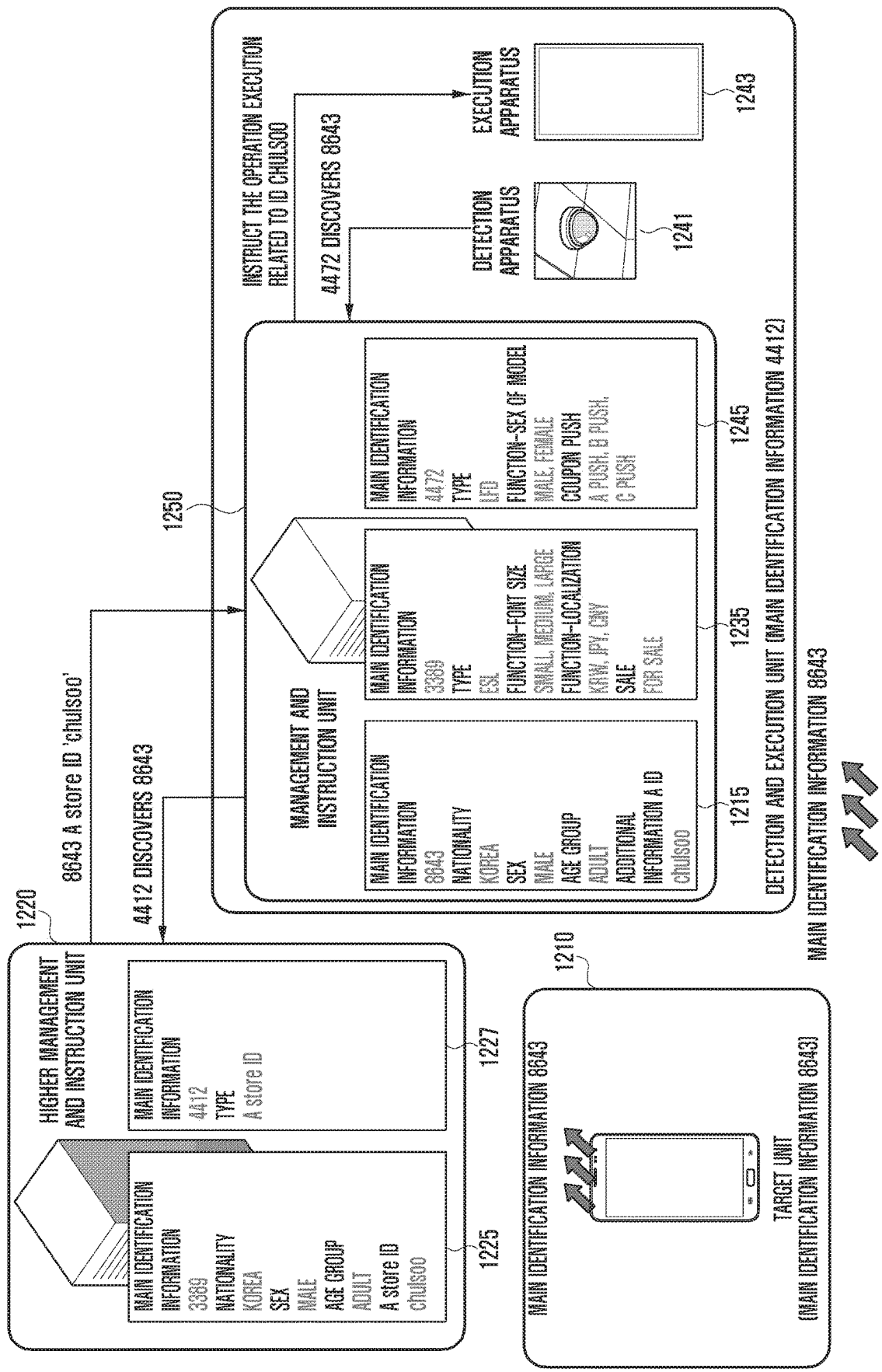
FIG. 12 is a diagram showing another example of a user-customized service providing process in a user-customized service providing system according to an embodiment of the present invention.

FIG. 12 is a diagram showing an example of a user-customized service providing process in a user-customized service providing system according to an embodiment of the present invention.

With reference to FIG. 12, a user-customized service providing system is capable of including at least one target unit 1210, at least one higher management and instruction unit 1220 and at least one detection and execution unit 1240. The detection and execution unit 1240 is capable of including a detection apparatus 1241 for performing a detection function, an execution apparatus 1243 for performing an execution function, and a management and instruction unit 1250.

The management and instruction unit 1250 is capable of receiving target unit information 1215, and detection and execution unit information 1235 and 1245, according to the information registration procedure described above, and storing the received information according to main identification information. The higher management and instruction unit 1220 is capable of receiving target unit information 1225 and detection and execution unit information 1227 according to the information registration procedure described above, and storing the received information according to main identification information.

The target unit 1210 is capable of transmitting a signal including, e.g., its main identification information. For example, the target unit 1210 transmits main identification information 8643.

If the detection apparatus 1241 of the detection and execution unit 1240 receives, from the target unit 1210, main identification information regarding the target unit 1210, it may transmit, to the management and instruction unit 1250, a signal or message including the detected main identification information regarding the target unit 1210 along with its main identification information. For example, the detection apparatus 1241 transmits, to the management and instruction unit 1250, a signal including its main identification information 4412 along with main identification information 8643 regarding the target unit 1210, and enabling the management and instruction unit 1250 to recognize a detection and execution unit and a target unit detected by the detection and execution unit.

The management and instruction unit 1250 receives, form the detection apparatus 1241, main identification information regarding the detection and execution unit 1240 along with the main identification information regarding the target unit 1210, and transmits, to the higher management and instruction unit 1220, information notifying that the management and instruction unit 1250 has discovered the target unit 1210. For example, the management and instruction unit 1250 may transmits, to the higher management and instruction unit 1220, information notifying that the identification information 4412 has discovered identification information 8643.

The higher management and instruction unit 1220 is capable of detecting target unit information 1225 regarding the target unit 1210, corresponding to the received main identification information regarding the target unit, based on information received from the detection and execution unit 1240. In addition, the higher management and instruction unit 1220 is capable of detecting detection and execution unit information 1227 regarding a corresponding detection and execution unit 1240, using main identification information regarding the detection and execution unit 1240 that has transmitted, to the higher management and instruction unit 1220, information including main identification information regarding the target unit 1210. The higher management and instruction unit 1220 is capable of processing the detected target unit information 1225 and the detection and execution unit information 1227, identifying information related to the target unit 1210 corresponding to the detection and execution unit 1240, and transmitting the identified information to the detection and execution unit 1240. For example, referring to the detection and execution unit information 1227, it is appreciated that the detection and execution unit 1240 has been related to store A. Referring to the target unit information 1225, it is appreciated that the target unit 1210 includes store A ID (chulsoo) as information regarding store A. In contrast, the higher management and instruction unit 1220 is capable of transmitting, to the detection and execution unit 1240, information notifying that store A ID of 8643 is chulsoo.

The information transmitted from the higher management and instruction unit 1220 to the detection and execution unit 1240 may be processed by the management and instruction unit 1250. The management and instruction unit 1250 is capable of detecting target unit information 1215 regarding the target unit 1210 and detection and execution unit information 1245 regarding the detection and execution unit 1240. The management and instruction unit 1250 is capable of determining an execution operation, based on the detected target unit information 1215, the detection and execution unit information 1245, and the information received from the higher management and instruction unit 1220. For example, the management and instruction unit 1250 is capable of determining to provide ID chulsoo with advertisement for men's store A.

The management and instruction unit 1250 is capable of transmitting information instruction the determined execution operation to the execution apparatus 1243. For example, the management and instruction unit 1250 may transmit, to the execution apparatus 1243, information instructing to provide ID chulsoo with item advertisement for men's store A to.

The execution apparatus 1243 is capable of performing a function corresponding to the instruction information received from the management and instruction unit 1250. For example, the execution apparatus 1243 may display a screen to advertise items of men's store A to ID chulsoo.

Figure 13:
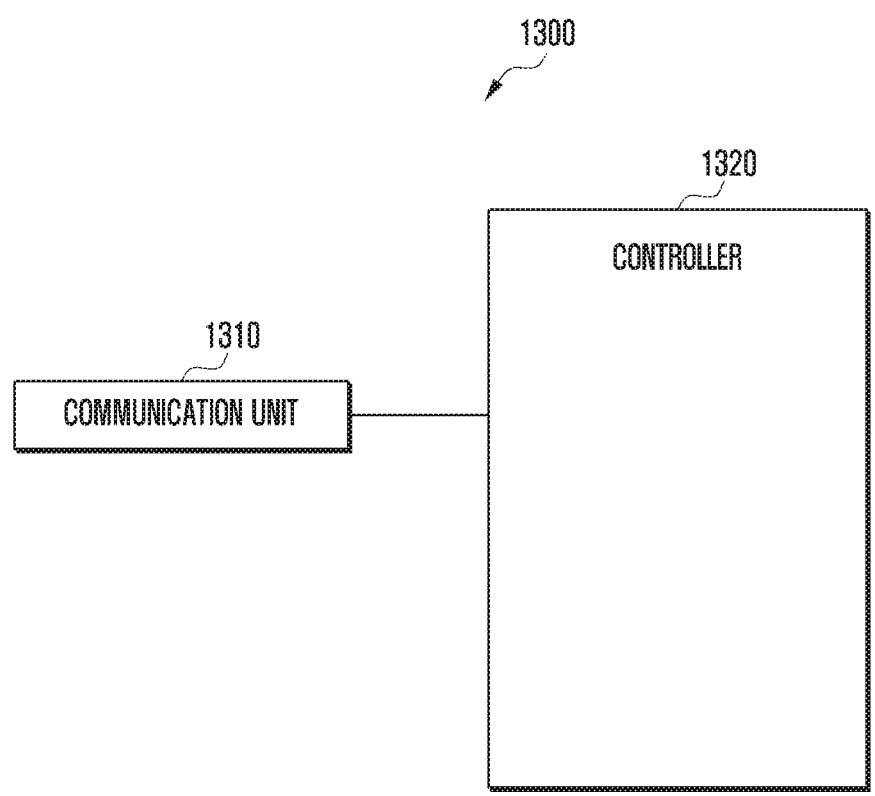
FIG. 13 is a block diagram of a target unit according to an embodiment of the present invention.

FIG. 13 is a block diagram of a target unit according to an embodiment of the present invention.

With reference to FIG. 13, a target unit according to an embodiment of the present invention is capable of including a communication unit 1310 and a controller 1320 for controlling all the operations of the target unit.

The controller 1320 controls the target unit to perform operations of one of the embodiments described above. For example, the controller 1320: creates main identification information regarding the target unit; transmits, a management and instruction unit, target unit information including the main identification information regarding the target unit; and advertises the main identification information regarding the target unit. The user information may include information according to a preset condition of the target unit. The user information may be created according to a user's input signals.

The controller 1320 encodes main identification information regarding the target unit so that only a permitted target can refer to the encoded result. That is, the target unit creates and transmits encoded main identification information. In this case, only a preset (permitted, authorized) specific target may refer to the main identification information regarding the target unit.

The communication unit 1310 performs the transmission/reception of signals according to operations of one of the embodiments described above signal. For example, the communication unit 1310: transmits target unit information to a management and instruction unit; and advertises the main identification information regarding the target unit.

Although it is not shown, it should be understood that the target unit may further include a memory, input unit, etc. The memory may store target unit information regarding the target unit. The input unit may instruct the controller 1320 to control the target unit to perform specific functions according to a user's inputs.

Figure 14:
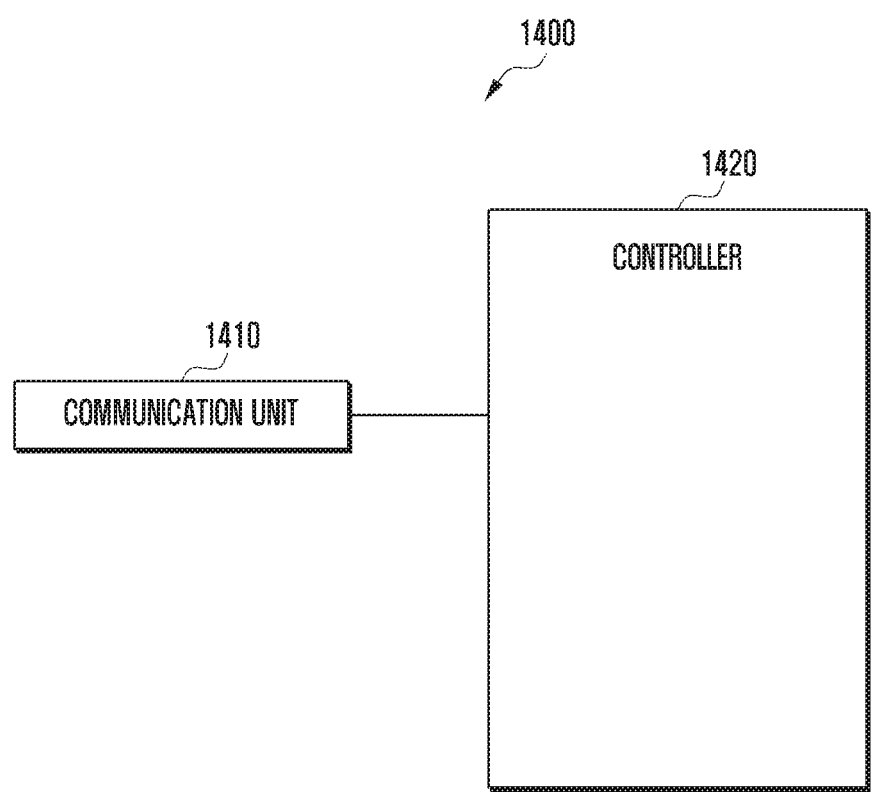
FIG. 14 is a block diagram of a detection and execution unit according to an embodiment of the present invention.

FIG. 14 is a block diagram of a detection and execution unit according to an embodiment of the present invention.

With reference to FIG. 14, a detection and execution unit according to an embodiment of the present invention is capable of including a communication unit 1410 and a controller 1420 for controlling all the operations of the detection and execution unit.

The controller 1420 controls the detection and execution unit to perform operations of one of the embodiments described above. For example, the controller 1420: transmits, to a management and instruction unit, detection and execution unit information including main identification information regarding the detection and execution unit, and detects main identification information regarding the target unit; transmits, to the management and instruction unit, the detected main identification information regarding the target unit and the detected main identification information regarding the detection and execution unit; and receives, from the management and instruction unit, a message including operation information regarding the detection and execution unit according to the target unit; and performs the function according to the message.

The controller 1420: collects information created with respect to a specific target unit; and transmits the collected information to the management and instruction unit.

The controller 1420 decodes the encoded, main identification information regarding the target unit, and detects the main identification information regarding the target unit. That is, if the target unit performs the transmission of the encoded main identification information, the controller 1420 decodes the encoded information. The keys used for encryption and decryption may have been set between the target unit and the detection and execution unit.

The communication unit 1410 performs the transmission/reception of signals according to operations of one of the embodiments described above signal. For example, the communication unit 1410: transmits the detection and execution unit information to the management and instruction unit; transmits, to the management and instruction unit, the detected, main identification information regarding the target unit and the detected, main identification information regarding the detection and execution unit; and received, from the management and instruction unit, a message including operation information regarding the detection and execution unit.

Although it is not shown, it should be understood that the detection and execution unit may further include a memory, input unit, etc. The memory may store detection and execution unit information regarding the detection and execution unit, and its detected, main identification information regarding the target unit. The input unit may instruct the controller 1420 to control the detection and execution unit to perform specific functions according to a user's inputs.

Figure 15:
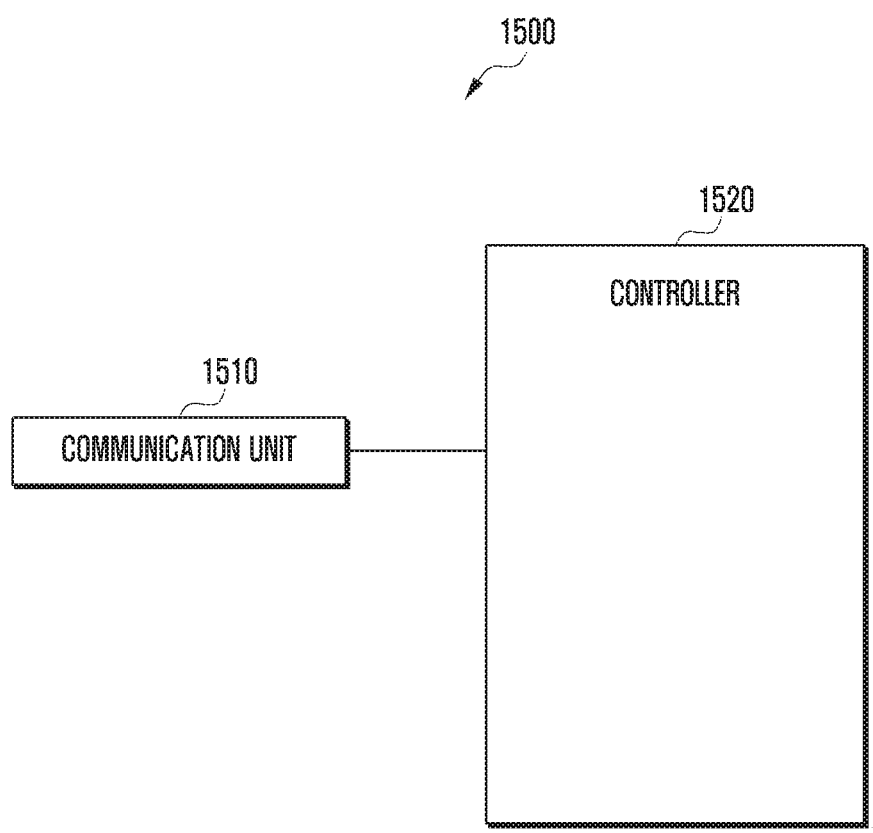
FIG. 15 is a block diagram of a management and instruction unit according to an embodiment of the present invention.

FIG. 15 is a block diagram of a management and instruction unit according to an embodiment of the present invention.

With reference to FIG. 15, a management and instruction unit according to an embodiment of the present invention is capable of including a communication unit 1510 and a controller 1520 for controlling all the operations of the management and instruction unit.

The controller 1520 controls the management and instruction unit to perform operations of one of the embodiments described above. For example, the controller 1520 controls: the storage of at least one piece of target unit information including main identification information regarding the target unit and at least one pied of detection and execution unit information including main identification information regarding the detection and execution unit; the reception of main identification information regarding the target unit, detected by the detection and execution unit, and main identification information regarding the detection and execution unit, from the detection and execution unit, the determination of operation information regarding the detection and execution unit according to the main identification information regarding the target unit; and the transmission of operation information regarding the detection and execution unit, according to the main identification information regarding the target unit, to the detection and execution unit.

The controller 1520 receives: user information including the main identification information regarding the target unit from the target unit; and information regarding the detection and execution unit, including the main identification information regarding the detection and execution unit, from the detection and execution unit. The user information may include different information according to detection and execution units.

The controller 1520: receives, from the detection and execution unit, information created with respect to a specific target unit, collected by the detection and execution unit; and alters the user information or the device information, using information created with respect to the collected, specific target unit. The operation information regarding the detection and execution unit according to the main identification information regarding the target unit may include a function instructing the provision of a push service, according to the main identification information regarding the target unit.

If the main identification information regarding the target unit, received from the detection and execution unit, has not been decoded, the controller 1520 decodes the information and stores the device information.

The communication unit 1510 performs the transmission/reception of signals according to operations of one of the embodiments described above signal. For example, the communication unit 1510 receives: target unit information including the main identification information regarding the target unit from the target unit; and detection and execution unit information including the main identification information regarding the detection and execution unit from the detection and execution unit. The communication unit 1510 transmits operation information regarding the detection and execution unit to the detection and execution unit.

Although it is not shown, it should be understood that the management and instruction unit may further include a memory, input unit, etc. The memory may store target unit information regarding the target unit, management and instruction unit information regarding the management and instruction unit, received main identification information regarding the target unit, and main identification information regarding the detection and execution unit. The input unit may instruct the controller 1320 to control the management and instruction unit to perform specific functions according to a user's inputs.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

Meanwhile, the terms and words used in the description are not limited to the bibliographical meanings, but, are merely used by the inventor to enable a clear and consistent understanding of the present disclosure. Accordingly, it should be apparent to those skilled in the art that the description of various embodiments of the present disclosure is provided for illustration purpose only and not for the purpose of limiting the present disclosure as defined by the appended claims and their equivalents.

The invention claimed is:

1. A method for providing a user-customized service of a terminal, the method comprising:
    transmitting, to a server, user information including first identification information of the terminal for registering the user information corresponding to the terminal in the server, wherein the user information includes information determined based on a category of a device; and
    advertising the first identification information,
    wherein device information including second identification information of the device for registering the device information corresponding to the device in the server and executable functions of the device is transmitted from the device to the server,
    wherein a message including the advertised first identification information and the second identification information is transmitted from the device to the server, in response to the advertised first identification information detected by the device,
    wherein a specific function is selected among the executable functions by the server, based on the user information corresponding to the first identification information and the device information corresponding to the second identification information, in response to the message being received by the server,
    wherein a command message including operation information for performing the specific function is transmitted from the server to the device,
    wherein the device information is transmitted from the device to the server,
    wherein information which is generated for a specific terminal and which is collected is transmitted from the device to the server,
    wherein the user information or the device information is changed by the server, using the information generated for the specific terminal,
    wherein the user information comprises items of information which differ from each other according to devices,
    wherein the operation information is determined to make an instruction to provide a push service according to the first identification information by the server, and
    wherein the first identification information received from the device is decoded by the server if the first identification information has not been decoded.

2. The method of claim 1,
    wherein the user information comprises information according to a preset condition of the terminal,
    wherein the user information is generated based on a user input signal, or
    wherein the first identification information is encoded for permitting to be confirmed by a specific target.

3. A method for a device to provide a user-customized service comprising:
    transmitting, to a server, device information including second identification information of a device for registering the device information corresponding to the device in the server and executable functions of the device;
    obtaining first identification information;
    transmitting, to the server, a message including the obtained first identification information and the second identification information;
    transmitting, to the server, the device information;
    transmitting, to the server, information which is generated for a specific terminal and which is collected by the device;
    receiving, from the server, a command message including operation information for performing a specific function, wherein the specific function is selected among the executable functions by the server, based on user information corresponding to the first identification information and the device information corresponding to the second identification information; and
    performing the specific function based on the command message,
    wherein the user information including the first identification information of a terminal for registering the user information corresponding to the terminal in the server is transmitted from the terminal to the server,
    wherein the user information including the first identification information, wherein the user information includes information determined based on a category of the device is transmitted from the terminal to the server,
wherein the user information or the device information is changed by the server, using the information generated for the specific terminal,
wherein the user information comprises items of information which differ from each other according to devices,
wherein the operation information is determined to make an instruction to provide a push service according to the first identification information by the server, and
wherein the first identification information received from the device is decoded by the server if the first identification information has not been decoded.

4. The method of claim 3, further comprising:
collecting information generated for a specific terminal; and
transmitting the collected information to the server,
wherein the obtaining of the first identification information comprises decoding the first identification information which is encoded.

5. A method for providing a user-customized service of a server, the method comprising:
storing user information including first identification information of a terminal, and device information including second identification information of a device and executable functions of the device;
receiving, from the device, a message including the second identification information and the first identification information detected by the device;
receiving, from the terminal, the user information including the first identification information, wherein the user information includes information determined based on a category of the device;
receiving, from the device, the device information;
receiving, from the device, information which is generated for a specific terminal and which is collected by the device;
selecting a specific function among the executable functions of the device, based on the user information corresponding to the first identification information and the device information corresponding to the second identification information;
determining operation information for performing the specific function of the device;
transmitting, to the device, a command message including the operation information of the device; and
changing the user information or the device information, using the received information generated for the specific terminal,
wherein the user information comprises items of information which differ from each other according to devices,
wherein the determining of the operation information of the device comprises determining to make an instruction to provide a push service according to the first identification information, and
wherein the storing of the user information and the device information comprises decoding the first identification information received from the device if the first identification information has not been decoded.

6. A terminal comprising:
a transceiver; and
a controller configured to:
control the transceiver to transmit, to a server, user information including first identification information of the terminal for registering the user information corresponding to the first identification information in the server, wherein the user information includes information determined based on a category of a device, and
control the transceiver to advertise the first identification information,
wherein device information including second identification information of the device for registering the device information corresponding to the device in the server and executable functions of the device is transmitted from the device to the server,
wherein a message including the advertised first identification information and the second identification information is transmitted from the device to the server, in response to the advertised first identification information detected by the device,
wherein a specific function is selected among the executable functions by the server, based on the user information corresponding to the first identification information and the device information corresponding to the second identification information, in response to the message being received by the server,
wherein a command message including operation information for performing the specific function is transmitted from the server to the device,
wherein the device information is transmitted from the device to the server,
wherein information which is generated for a specific terminal and which is collected is transmitted from the device to the server,
wherein the user information or the device information is changed by the server, using the information generated for the specific terminal,
wherein the user information comprises items of information which differ from each other according to devices,
wherein the operation information is determined to make an instruction to provide a push service according to the first identification information by the server, and
wherein the first identification information received from the device is decoded by the server if the first identification information has not been decoded.

7. The terminal of claim 6, wherein the user information further comprises information according to a preset condition of the terminal.

8. The terminal of claim 6, wherein the user information is generated based on a user input signal.

9. The terminal of claim 6, wherein the controller is further configured to encode the first identification information for permitting to be confirmed by a specific target.

10. A device comprising:
a transceiver; and
a controller configured to:
control the transceiver to transmit, to a server, device information including second identification information of a device for registering the device information corresponding to the device in the server and executable functions of the device,
obtain first identification information,
control the transceiver to transmit, to the server, a message including the obtained first identification information and the second identification information, control the transceiver to receive, from the server, a
command message including operation information
for performing a specific function, wherein the specific function is selected among the executable functions by the server, based on user information corresponding to the first identification information and
the device information corresponding to the second
identification information,
control the transceiver to transmit, to the server, the
device information,
control the transceiver to transmit, to the server, information which is generated for a specific terminal and
which is collected by the device, and
perform the specific function based on the command
message,
wherein the user information including the first identification information of a terminal for registering the user
information corresponding to the terminal in the server
is transmitted from the terminal to the server,
wherein the user information including the first identification information, wherein the user information
includes information determined based on a category of
the device is transmitted from the terminal to the server,
wherein the user information or the device information is
changed by the server, using the information generated
for the specific terminal,
wherein the user information comprises items of information which differ from each other according to
devices,
wherein the operation information is determined to make
an instruction to provide a push service according to the
first identification information by the server, and
wherein the first identification information received from
the device is decoded by the server if the first identification information has not been decoded.

11. The device of claim 10, wherein the controller is
further configured to:
collect information generated for a specific terminal; and
control the transceiver to transmit, to the server, the
collected information.

12. The device of claim 10, wherein the controller is
further configured to decode the first identification information which is encoded, so that the decoded first identification information can be obtained.

13. The device of claim 10, further comprising:
a detection apparatus configured to obtain the first identification information of the terminal; and
an execution apparatus configured to perform the specific
function based on the command message received from
the server.

14. A server comprising:
a transceiver; and
a controller configured to:
store user information including first identification
information of a terminal and device information
including second identification information of a
device and executable functions of the device,
control the transceiver to receive, from the device, a
message including the second identification information and the first identification information of the
terminal detected by the device,
control the transceiver to receive, from the terminal, the
user information including the first identification
information, wherein the user information includes
information determined based on a category of the
device,
control the transceiver to receive, from the device, the
device information,
control the transceiver to receive, from the device,
information which is generated for a specific terminal and which is collected by the device,
select a specific function among the executable functions of the device based on the user information
corresponding to the first identification information
and the device information corresponding to the
second identification information,
determine operation information for performing the
specific function of the device according to the first
identification information of the terminal,
control the transceiver to transmit, to the device, a
command message including the operation information of the device,
change the user information or the device information,
using the received information generated for the
specific terminal, and
decode the first identification information received
from the device if the first identification information
has not been decoded,
wherein the user information comprises items of information which differ from each other according to
devices, and
wherein the operation information of the device comprises an instruction to provide a push service
according to the first identification information of the
terminal.

15. The server of claim 14, wherein the controller is
further configured to control the transceiver to receive:
the user information including the first identification
information from the terminal, and the device information including the second identification information
from the device.

* * * * *